June 1, 1965 K. N. KRIER ETAL 3,186,021
POWER SWEEPER
Filed Feb. 20, 1959 15 Sheets-Sheet 7
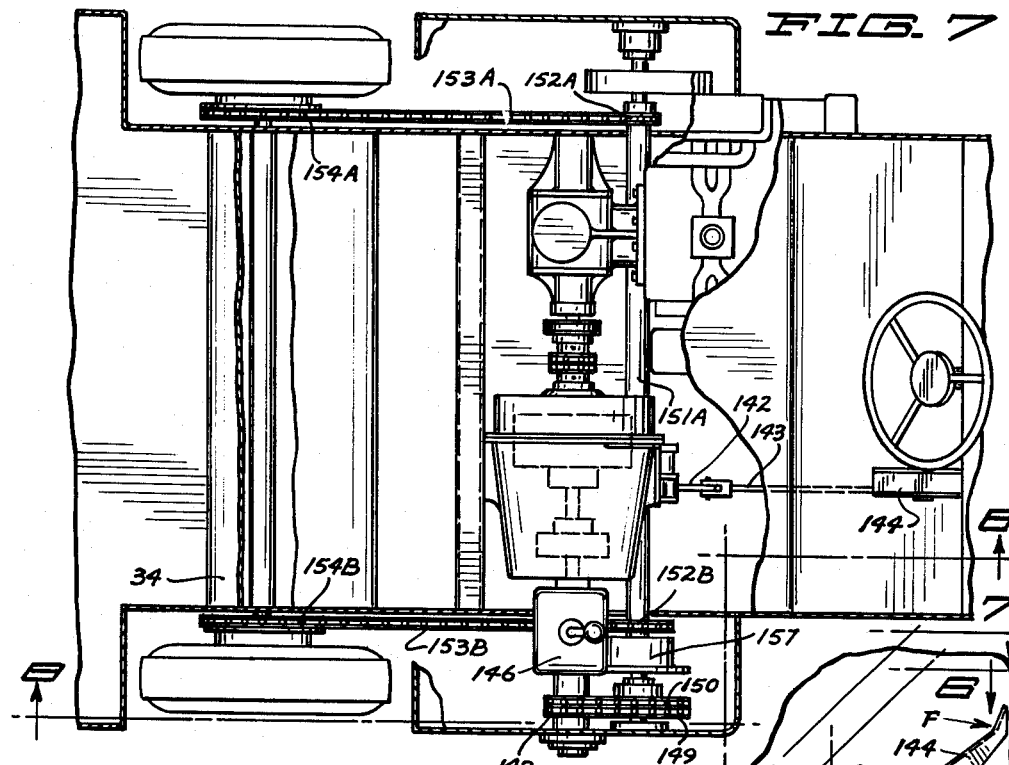
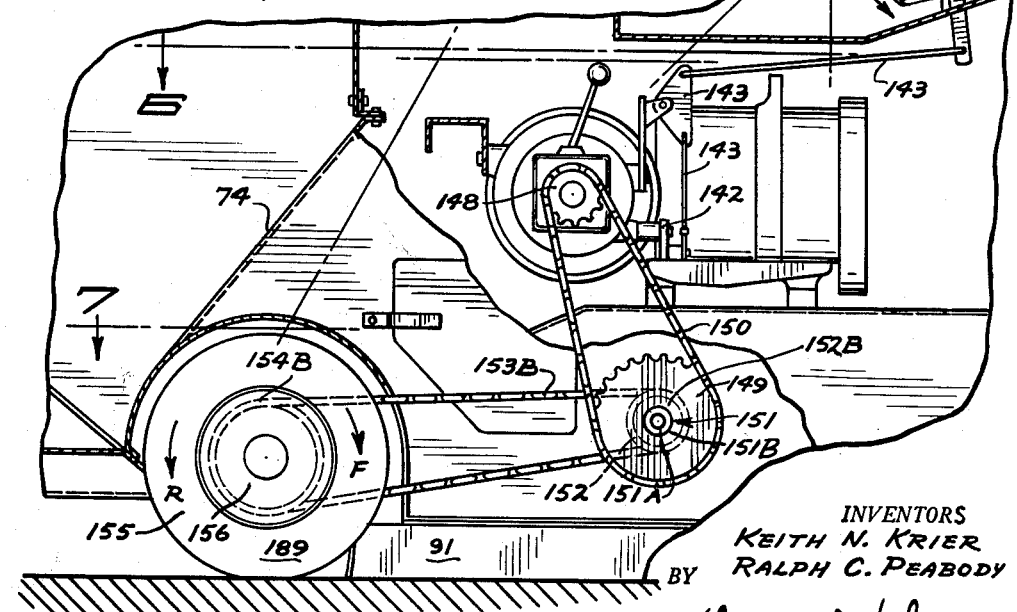
INVENTORS
KEITH N. KRIER
RALPH C. PEABODY
BY Dugger & Johnson
ATTORNEYS June 1, 1965  K. N. KRIER ETAL  3,186,021
POWER SWEEPER
Filed Feb. 20, 1959  15 Sheets-Sheet 8

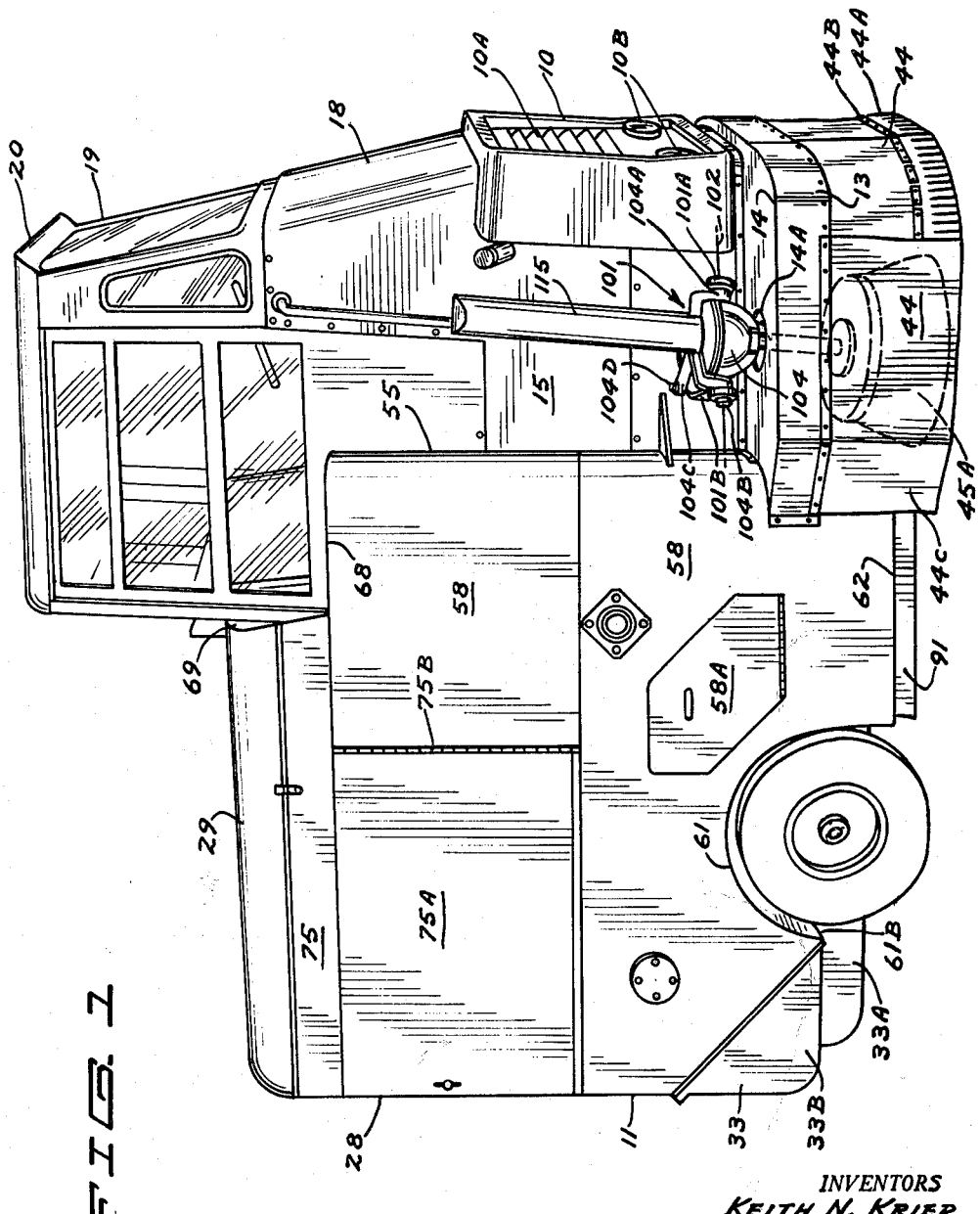

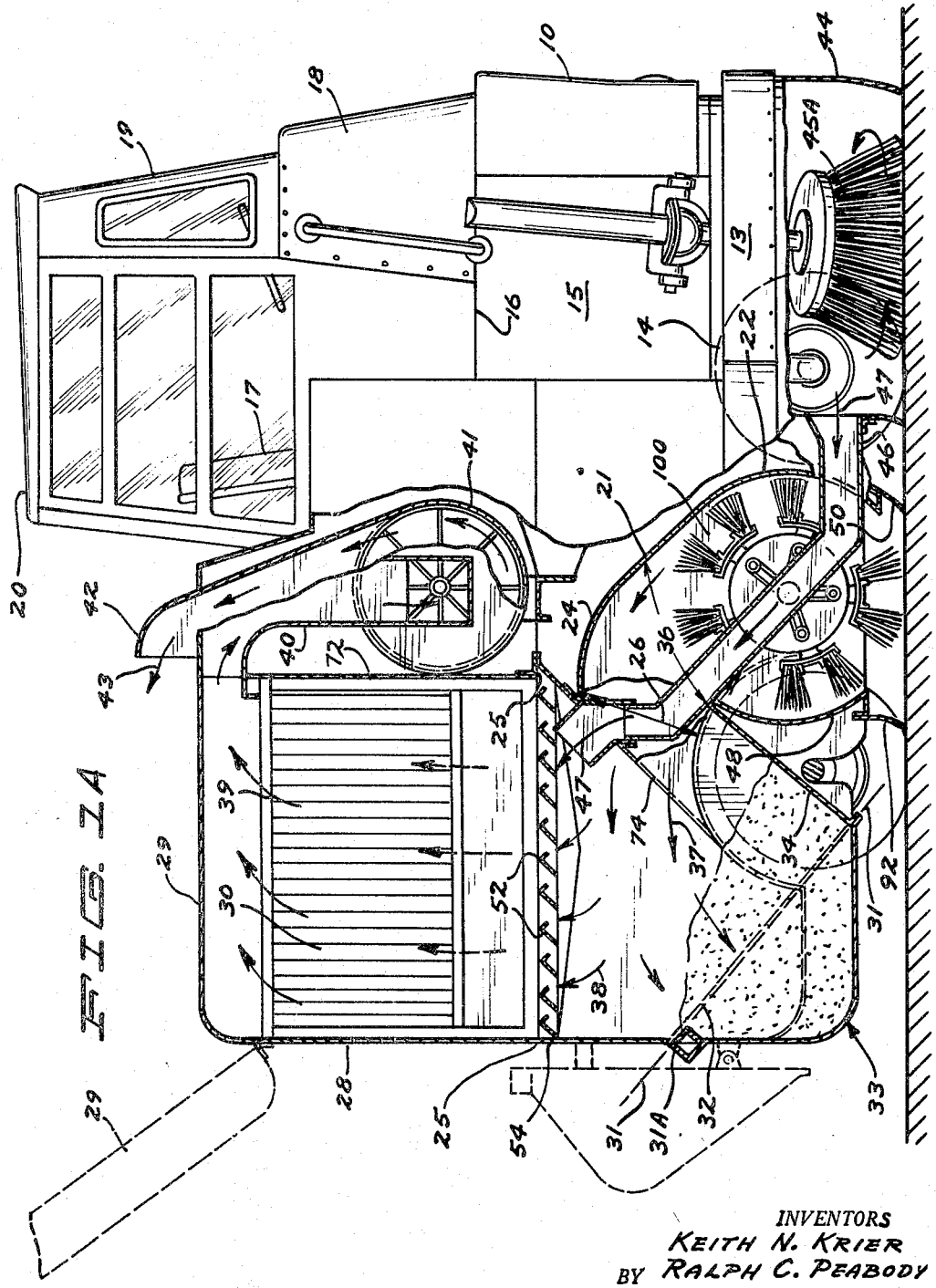

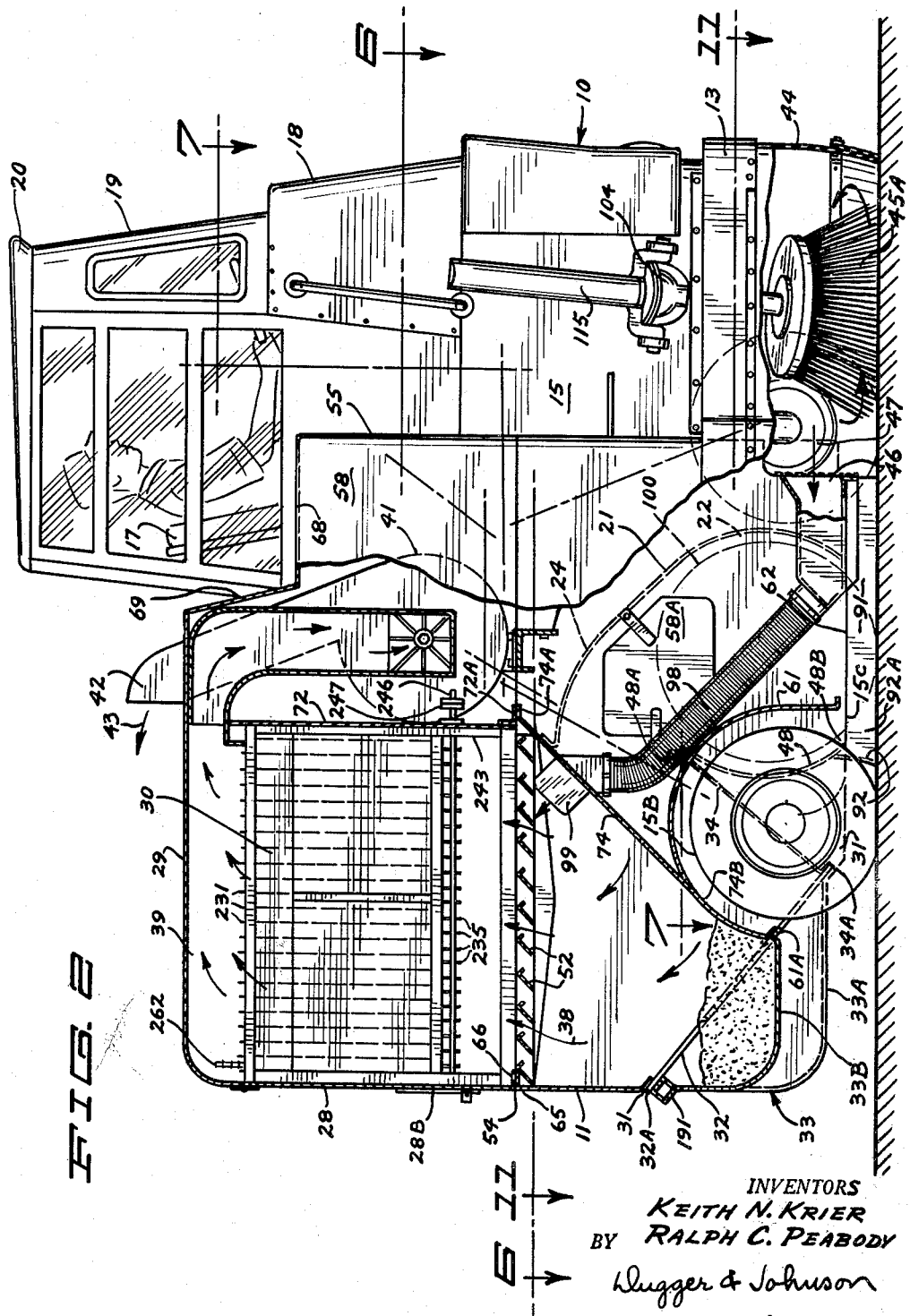

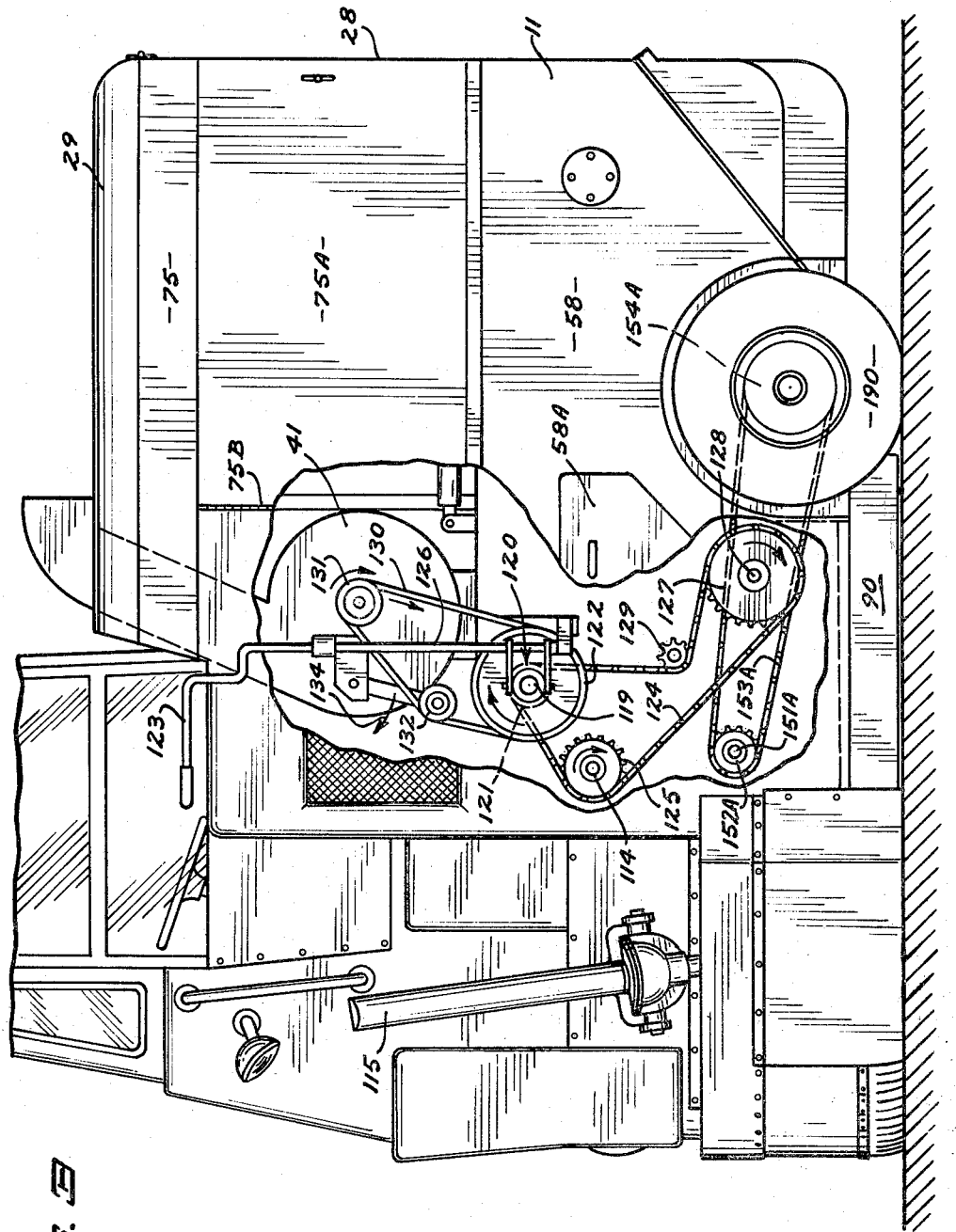

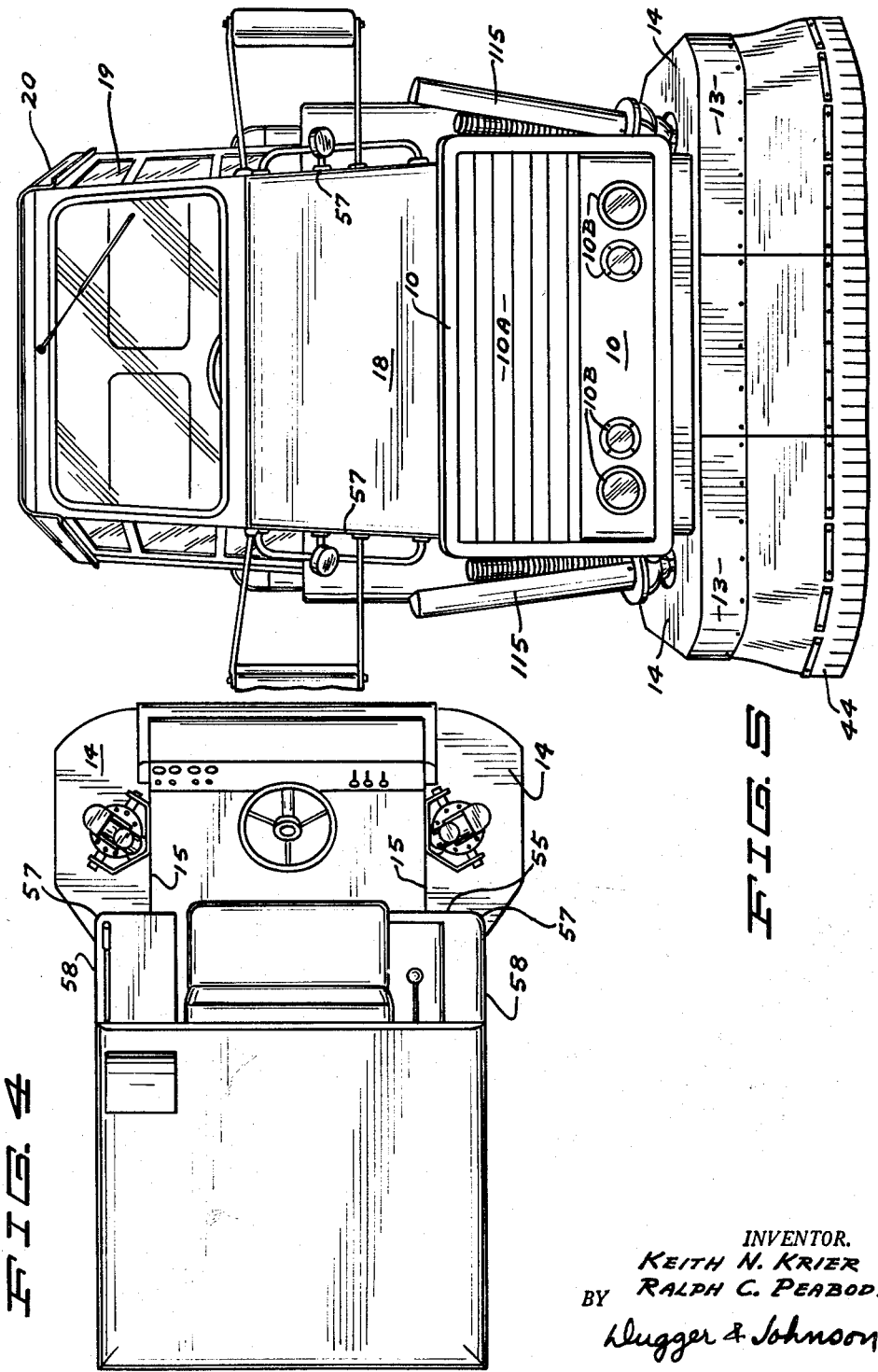

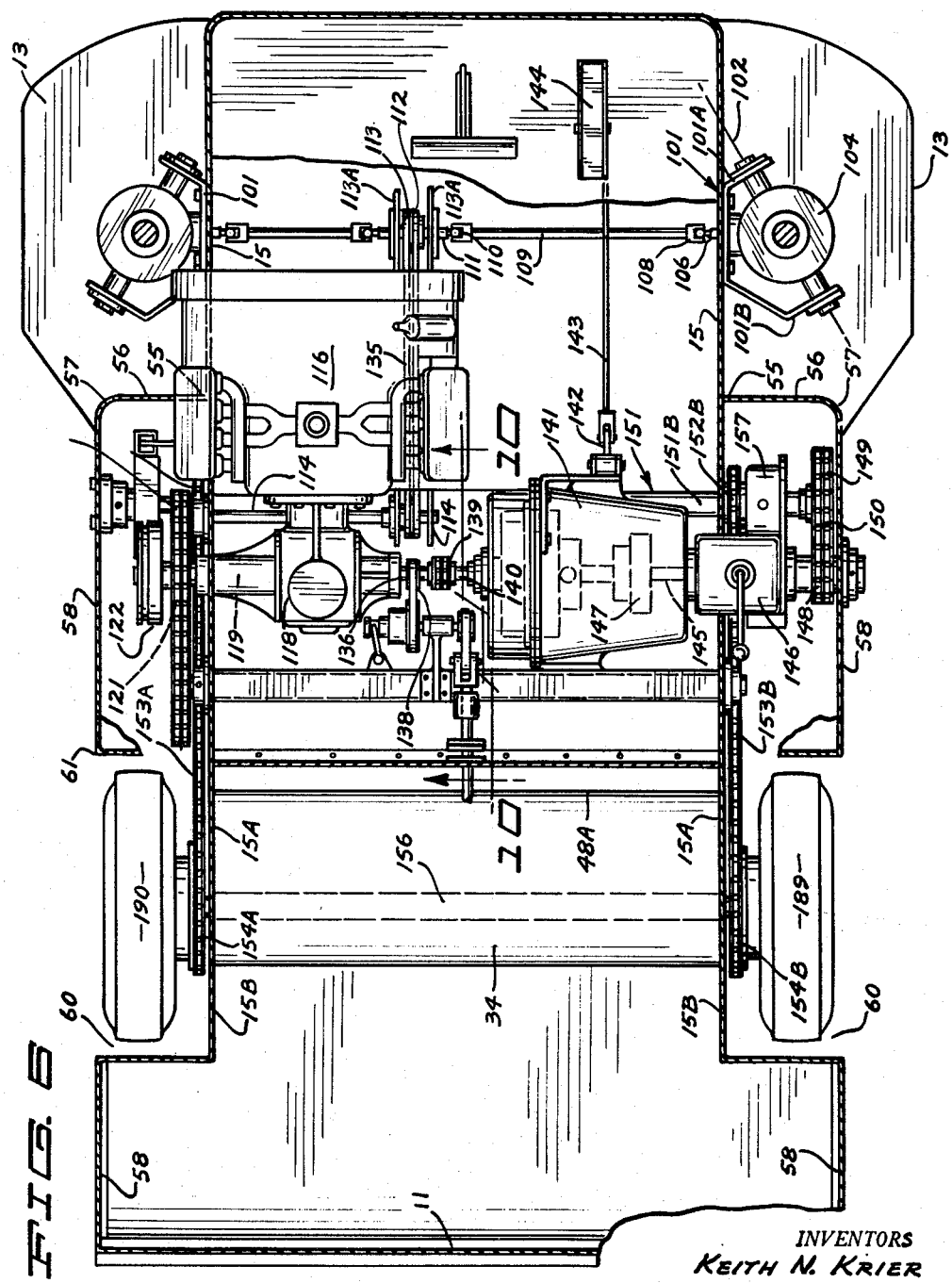

INVENTORS
KEITH N. KRIER
BY RALPH C. PEABODY

Dugger & Johnson
ATTORNEYS

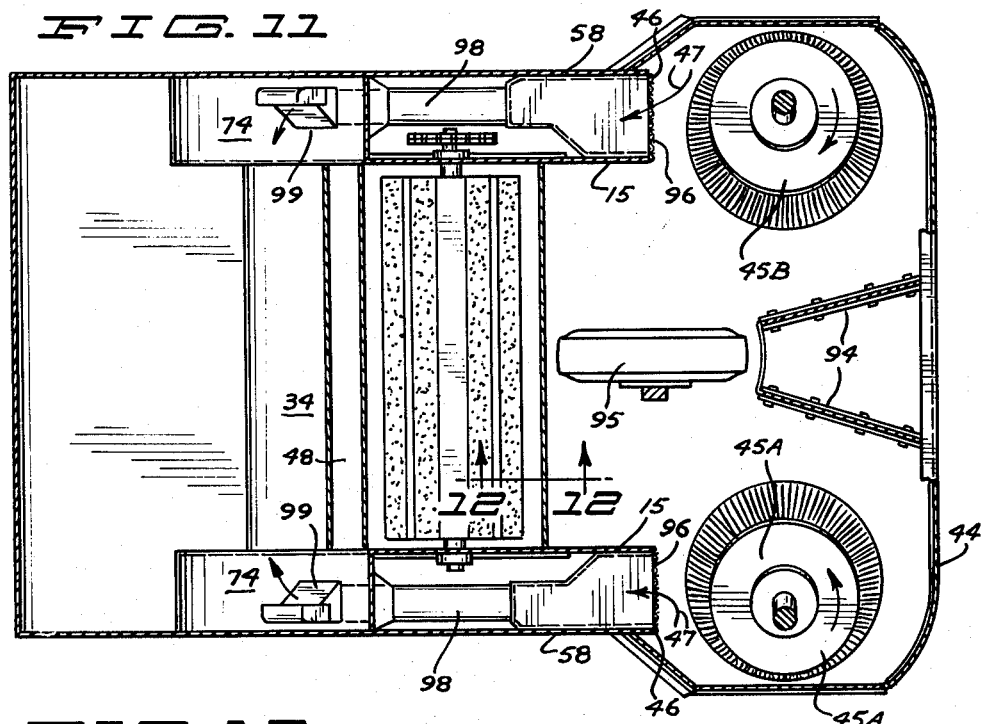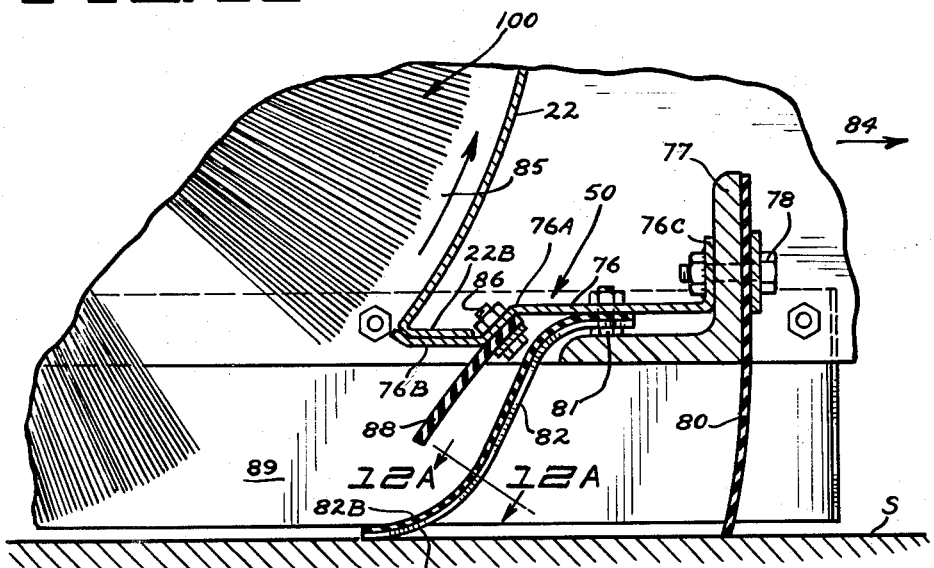

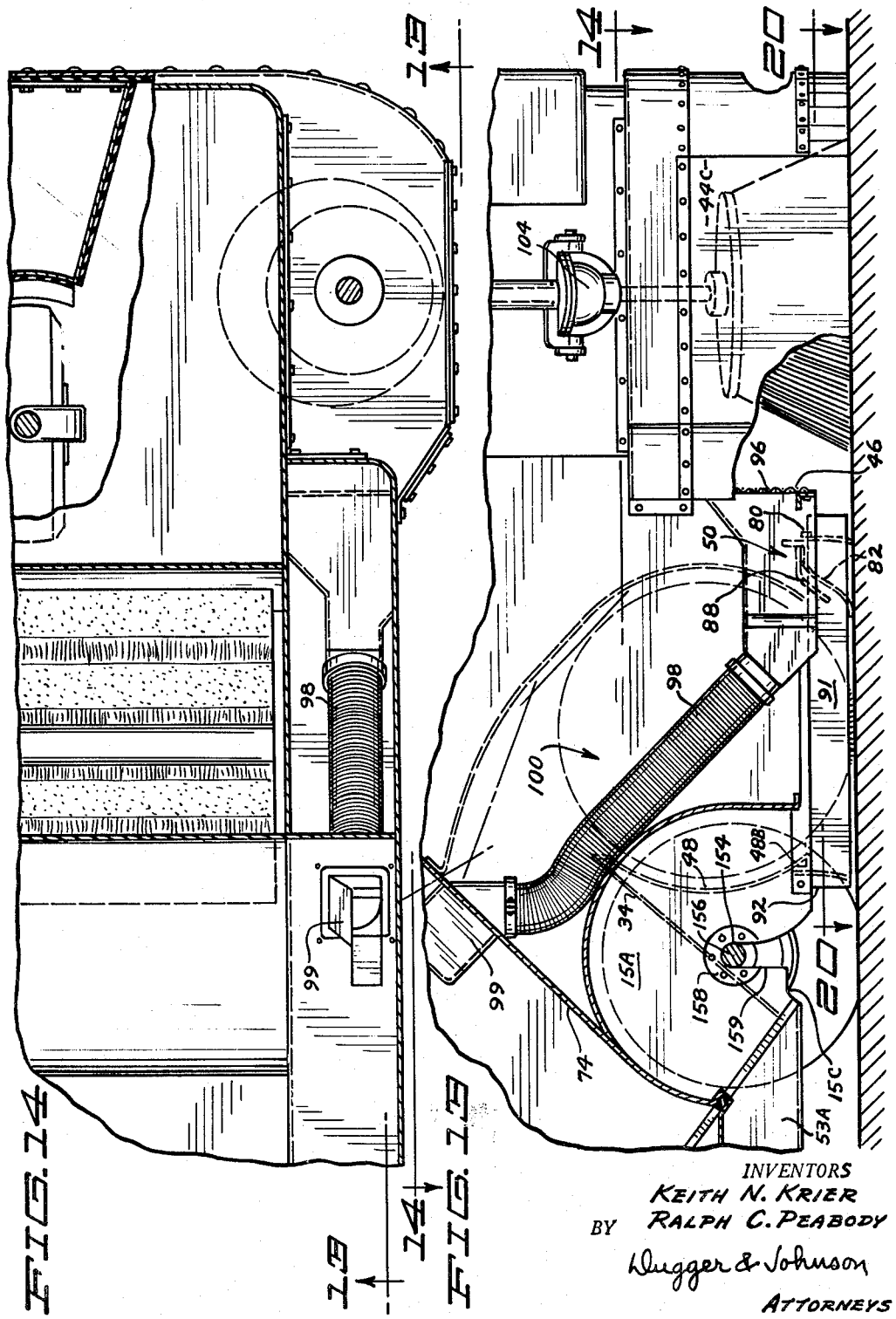

June 1, 1965     K. N. KRIER ETAL     3,186,021
POWER SWEEPER
Filed Feb. 20, 1959     15 Sheets-Sheet 11

INVENTOR.
KEITH N. KRIER
BY RALPH C. PEABODY

Dugger & Johnson
ATTORNEYS

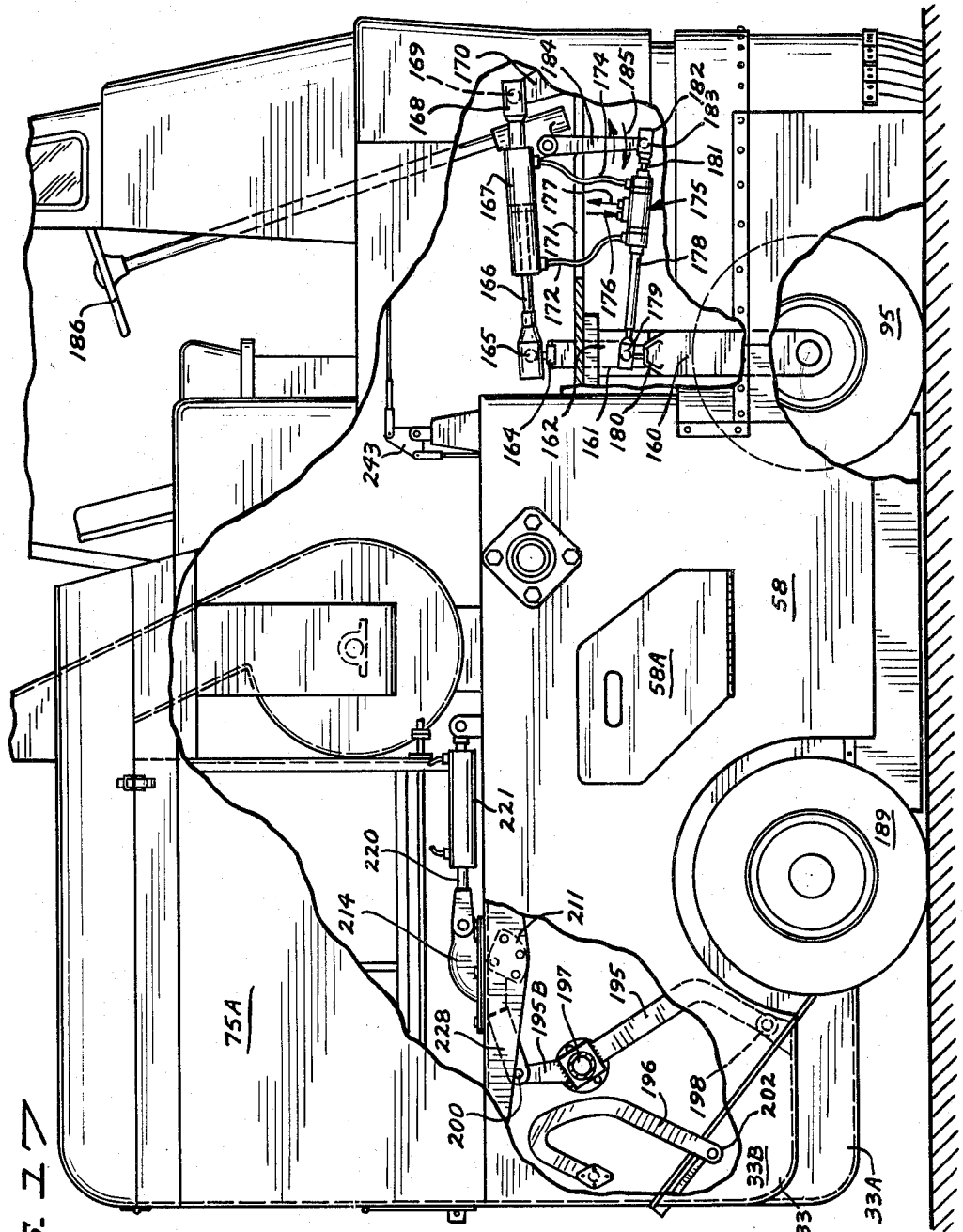

June 1, 1965 K. N. KRIER ETAL 3,186,021
POWER SWEEPER
Filed Feb. 20, 1959 15 Sheets-Sheet 13

INVENTORS
KEITH N. KRIER
BY RALPH C. PEABODY
Llugger & Johnson
ATTORNEYS

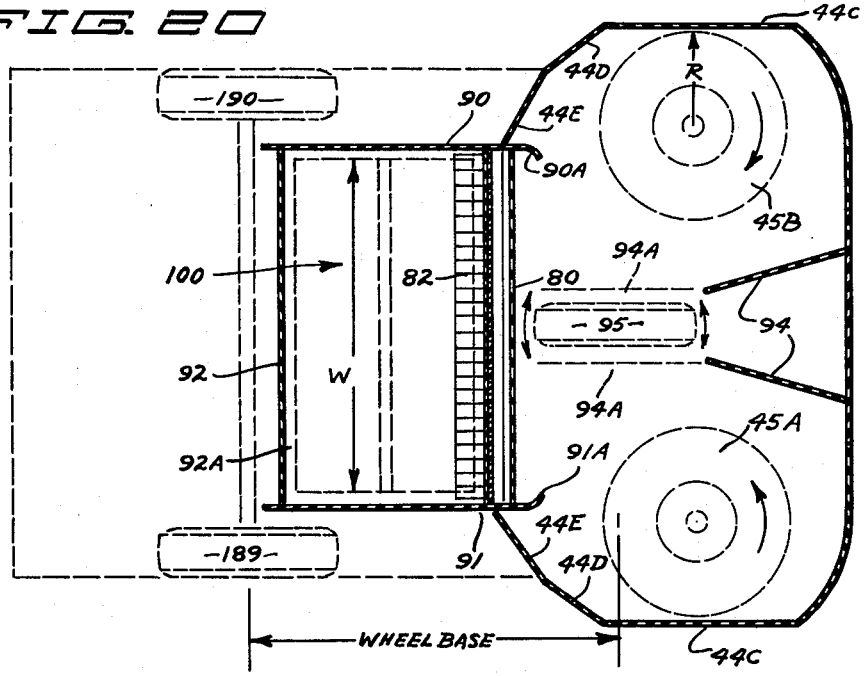
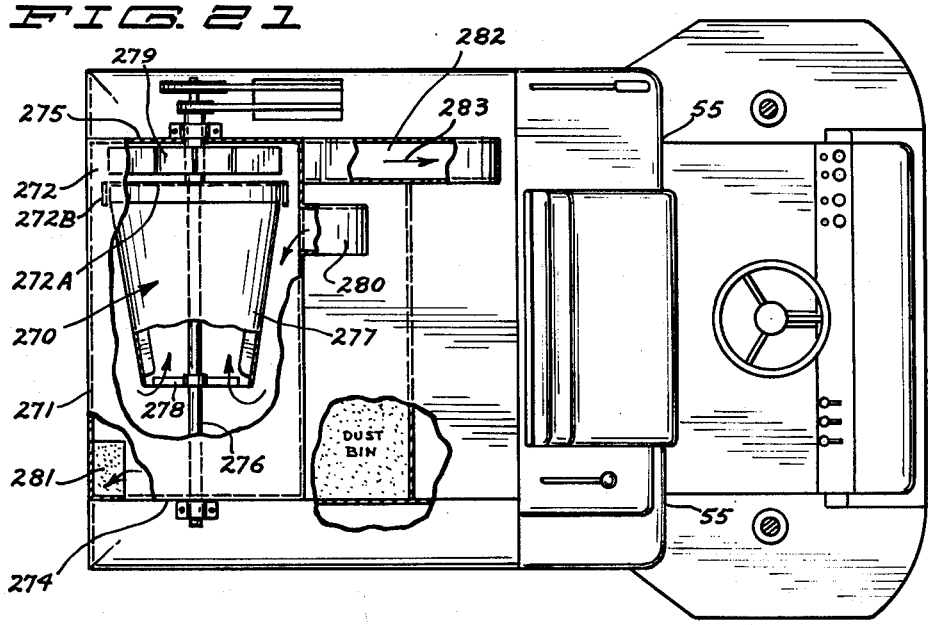

June 1, 1965  K. N. KRIER ETAL  3,186,021
POWER SWEEPER

Filed Feb. 20, 1959  15 Sheets-Sheet 15

INVENTORS
KEITH N. KRIER
RALPH C. PEABODY
BY
Dugger & Johnson
ATTORNEYS

United States Patent Office 3,186,021
Patented June 1, 1965

3,186,021
POWER SWEEPER
Keith N. Krier and Ralph C. Peabody, Minneapolis, Minn., assignors to G. H. Tennant Company, Minneapolis, Minn., a corporation of Minnesota
Filed Feb. 20, 1959, Ser. No. 794,762
13 Claims. (Cl. 15—340)

This invention relates to machines for sweeping large horizontal surfaces such as roads, aircraft runways, taxiways, and parking areas, docks, areaways, and the like. On such surfaces there is found the widest variety of dirt, stones, and general litter as well as hard objects such as bricks, chunks of concrete, pieces of wood, metallic objects, bottles, boards, cans, and glass. Frequently, the dirt and litter may be compacted, as by drippings of oil or exudations of asphalt, as where automotive equipment is frequently parked.

There is a dust problem involved in sweeping almost every such dirty or littered area, because in most instances any sweeping operation sufficiently vigorous to lift the dirt and litter inevitably raises dust. Dust may vary from small particles with diameters of several microns to larger visible size particles. The smaller sizes will frequently form a haze or smoke-like condition when set in motion by sweeping and this is objectionable.

In prior sweeping machines, as for example, mechanized street sweepers, provision has usually been made for sprinkling the area with water as it is swept, so as to keep down the dust. Use of water in this manner in dust control has many disadvantages. It is cumbersome and expensive to carry a supply of water on a mobile vehicle and the operating range (or time) of the vehicle is limited by the water supply. In order to control dust composed of the smaller size of the particles, such as several microns, it is necessary thoroughly to wet the area to be swept prior to sweeping, because no reasonable quantity of water falling through a duster or haze produced by the sweeping, is sufficient to entrap the dust particles and remove them. Therefore, when using water for dust control, the water is applied prior to sweeping so that the dust is agglomerated more or less as mud, and is prevented from being raised as dust. This has the disadvantage that the mudlike condition produced will smear the surfaces being swept, and therefore the surface is not really cleaned. Such wetted dust (mud) has an increased weight as compared with the dry material, and as such, is difficult to carry around. Also, the machine during the sweeping is coated with a wet or muddy covering which clings to the broom and to other working parts and prevents efficient operation.

In certain prior art machines, attempts have been made to control the dust problem by enclosing or partially enclosing the sweeping brushes and by providing a slight vacuum within the enclosure so as to prevent the dust from leaving the enclosure. While some control of the dust problem has been effected in this way, the results are less than completely effective.

It is an object of the present invention to provide an improved form of sweeping machine capable of sweeping large and even tremendous areas and capable of cleaning the area free from dust or even smaller size particles as well as large general litter, bricks, stones, metal and wood objects and the like. It is a further object of the invention to provide an improved sweeping machine in which a vigorous sweeping by a plurality of variously directed brushes is effected all within enclosures formed in the machine and wherein there is negative pressure and into which there is permitted a large but controlled inflow of air and to provide for separation of air from entrained dust particles sufficiently that the exhausted air after separation from the dust particles will not have a hazy dust laden or smoky appearance. It is a further object of the invention to provide an improved sweeping machine capable of being propelled forwardly or reversely at any speed from zero speed to a maximum in either direction without reducing the rate of sweeping effected by the machine at the various propulsion speeds. It is another object of the invention to provide a sweeping machine wherein dust raised as a result of the sweeping is entrained and separated, and the separated dust at intervals is collected in a remote hopper portion for ready disposal. It is still another object of the invention to provide a street sweeping machine capable of collecting the swept-up material, including dust in a dry condition, without raising the dust as it sweeps. It a further object of the invention to provide an improved sweeping machine wherein the refuse and dust swept up by the machine is collected in a hopper which can be moved automatically without manual force and dumped conveniently with free and complete emptying of the hopper. It is a further object of the invention to provide an improved street sweeping machine having a vacuum dust control thereon for brushes located at varying points on the machine and to provide in separate enclosures for the several brushes varying degrees of vacuum. It is another object of the invention to provide an improved street sweeping machine having complete dust protection thereon which is readily maneuverable in close quarters and capable of being turned at short radius and propelled at any desired speed without diminishing the sweeping action of the brush or the control of the dust effected by the machine. It is still another object of the invention to provide in a street sweeping machine an improved mechanical enclosure capable of conforming readily to irregularities of the surface being swept. It is another object of the invention to provide an improved sweeping machine wherein there is provided a machine frame of plate materials which, in addition to being the frame, also forms an open bottomed mechanical enclosure which is closed by the surface being swept and in which is contained the sweeping and dust collecting entities and in which a lower air pressure may be maintained in respect to the surface being swept. It is another object of the invention to provide in a street sweeping machine having dust facilities thereon, means for periodically cleaning and servicing the dust collecting facilities, all on an automatic basis.

Other and further objects are those inherent in the invention herein illustrated, described, and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The apparatus is illustrated with reference to the drawings wherein:

FIGURE 1 is a perspective side elevational view of one form of apparatus made in accordance with the invention:

FIGURE 1A is a schematic side elevational view, partly sectioned and with many parts deleted showing the main features of the machine plan and frame weldment;

FIGURE 2 is a side elevational view from the right side of the machine showing parts of the sides of the machine broken away and the interior of the machine partly in vertical section;

FIGURE 3 is a side elevational view from the left side of the machine showing portions of the side paneling of the machine broken away, illustrating particularly the blower apparatus and the drive for the brush mechanism and the final parts of the propulsive drive;

FIGURE 4 is a plan view of the machine;

FIGURE 5 is a front elevational view of the machine;

FIGURE 6 is a horizontal sectional view of the full machine taken along the line and at the approximate level of arrows 6—6 of FIGURE 2 and FIGURE 8;

Figure 9:
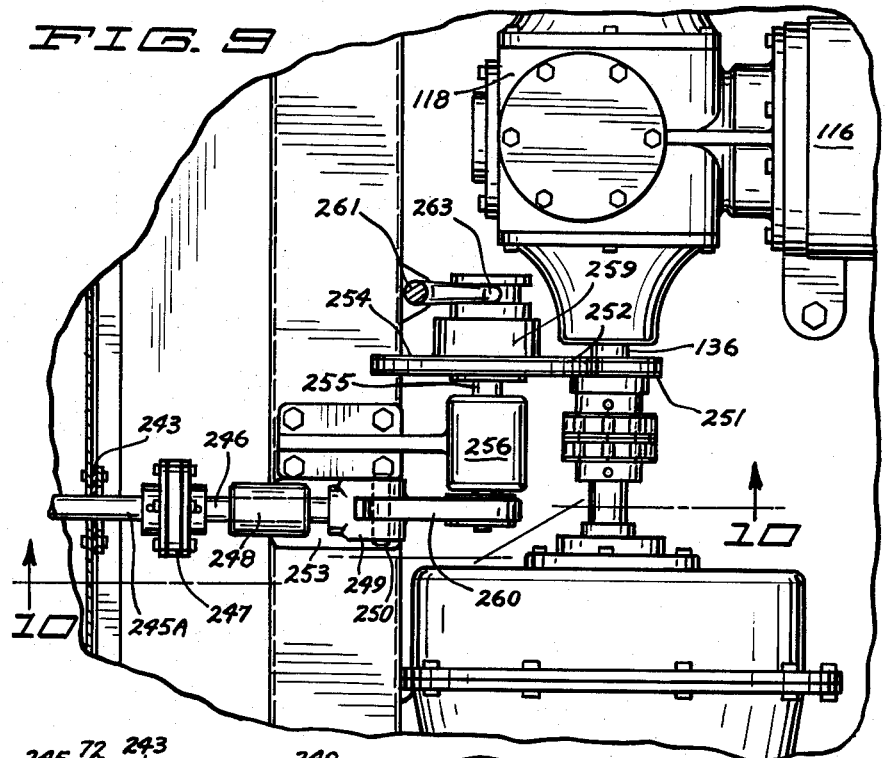
Figure 10:
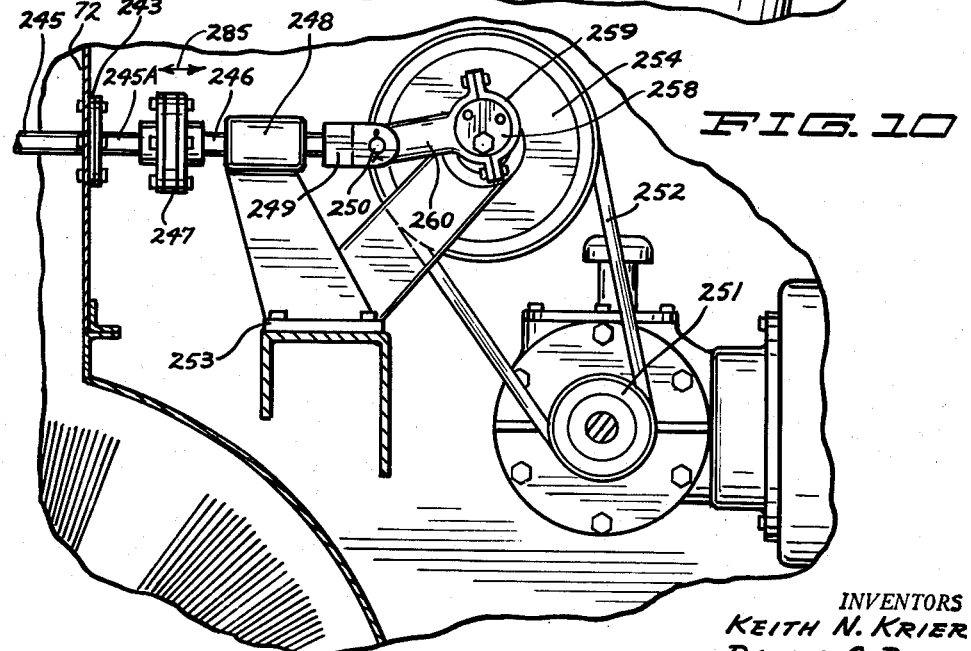
Figures 18, 19:
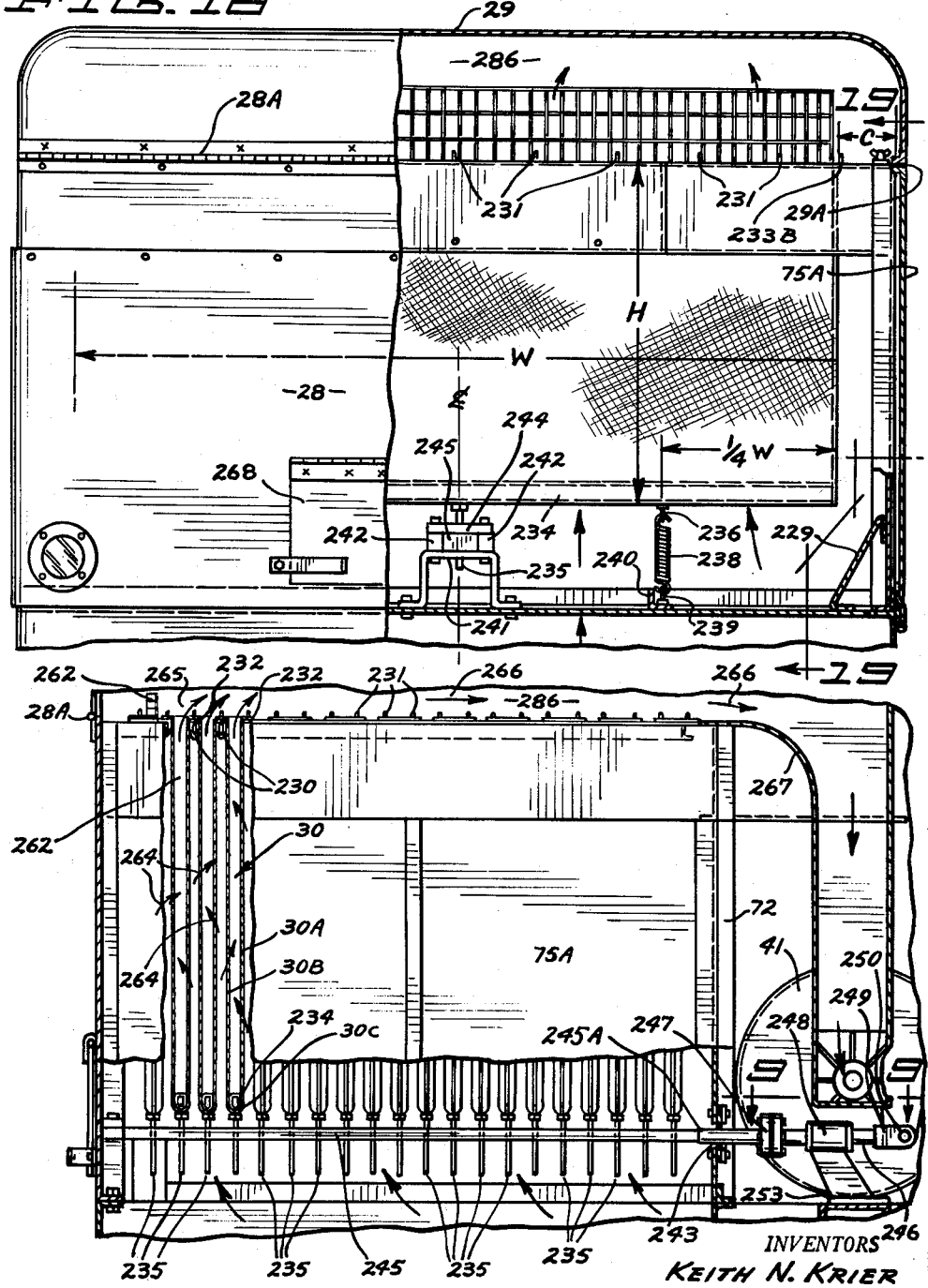
Figure 22:
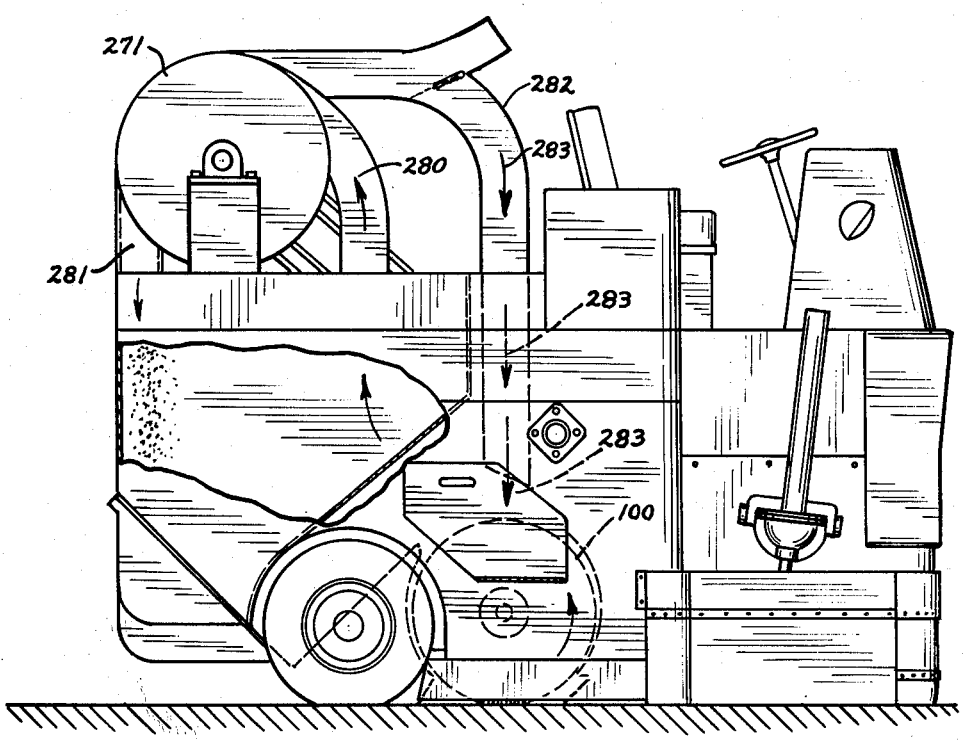
Figure 23:
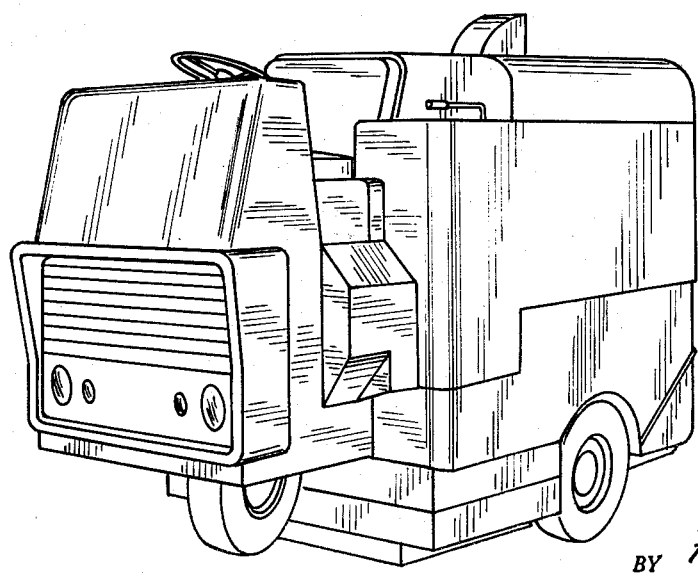

FIGURE 7 is a fragmentary horizontal sectional view along the line and in the direction of arrows 7—7 of FIGURE 2. In this sectional view the line at which the section is taken is dropped to successively lower levels to show varying parts of the mechanism. The section lines 7—7 are also shown in FIGURE 8;

FIGURE 8 is a fragmentary vertical longitudinal sectional view taken along the line and in the direction of arrows 8—8 of FIGURE 7; FIGURE 8 shows portions of the engine, transmission, and drive to the propulsive wheels of the machine;

FIGURE 9 is an enlarged fragmentary horizontal sectional view of the central part of FIGURE 6 illustrating in greater detail the portions of the transmission and filter shaker mechanism;

FIGURE 10 is a fragmentary vertical sectional view taken along the line and in the direction of arrows 10—10 of FIGURES 6 and 9;

FIGURE 11 is a horizontal sectional view taken along the line and in the direction of arrows 11—11 of FIGURE 2;

FIGURE 12 is an enlarged fragmentary vertical longitudinal sectional view taken along the lines and in the direction of arrows 12—12 of FIGURE 11;

FIGURE 12A is an enlarged fragmentary sectional view taken along the lines and in the direction of arrows 12A—12A of FIGURE 12;

FIGURE 13 is an enlarged fragmentary right side elevational view of the right front end of the machine taken with certain of the side housings broken away to illustrate the interior portions of the machine, this view being taken along the line and in the direction of arrows 13—13 of FIGURE 14;

FIGURE 14 is a fragmentary horizontal sectional view illustrating the same portion of the machine as shown in FIGURE 13, FIGURE 14 being taken along the line and in the direction of arrows 14—14 of FIGURE 13;

FIGURE 15 is an enlarged fragmentary right side elevational view of the rear portion of the machine showing the refuse hopper, certain portions of the side wall of the machine being broken away so as to illustrate the interior construction of the machine;

FIGURE 16 is an enlarged vertical sectional view taken along the line and in the direction of arrows 16—16 of FIGURE 15;

FIGURE 17 is a vertical side elevational view of the right side of the machine with various portions of the side walls broken away to illustrate, in respect to the front of the machine, the exterior mechanism and front steerable wheel, and in respect to the rear of the machine, the mechanism for holding and operating the refuse collection hopper;

FIGURE 18 is a fragmentary rear elevational view of the upper portion of the rear of the machine with the rear side wall partially broken away to show the interior construction of the dust collector surfaces;

FIGURE 19 is a vertical longitudinal fragmentary sectional view of the apparatus shown in FIGURE 18, taken along the line and in the direction of arrows 19—19 of FIGURE 18 showing the dust filtering portions of the apparatus, shaker mechanism and a portion of the vacuum blower system;

FIGURE 20 is a horizontal sectional view of the skirting portion of the housing around the several brushes of the machine, this view being taken at the level and in the direction of arrows 20—20 of FIGURE 13;

FIGURES 21 and 22 are related views illustrating a modified form of the machine having the operator cab removed, and the dust filtering mechanism replaced by another form of dust separator. In both of these figures, portions of the apparatus are broken away to show the interior construction;

FIGURE 23 is a perspective view from a position ahead of and to the left of the machine illustrating a modified form of the invention wherein brushes rotating about a vertical axis are not included and the operator cab is not included.

Throughout the drawings corresponding numerals refer to the same parts.

Referring to FIGURES 1 through 20;

The present invention comprises a mobile vehicle which has widely spaced rear propulsive wheels and a front steering wheel. The propulsive drive is by means of a suitable power source, such as an air cooled internal combustion engine. The propulsive drive extends from the engine thence through, preferably, an infinitely variable speed changer, thence through a conventional clutch and through a gear box having several forward speeds, and a reverse gear, and thence through chain drives to the rear wheels. In this way, the velocity of the vehicle may be varied from zero to a maximum speed in either direction.

The desideratum is to provide a wide range of propulsive speeds, forward and rearward, without, however, appreciably changing the brush velocity. This is achieved in the illustrated embodiment by using a nearly constant motor speed which is connected to drive the brush at a nearly constant speed and variability in propulsion. Velocity is achieved by interposing a variable ratio drive in the propulsion drive sequence. As an alternative form, there may be used separate motors, one for driving the brushes (at constant speeds) and another, through conventional clutch-gearbox or hydraulic transmissions for driving the propulsive components.

In general plan the frame of the vehicle is composed of a weldment made of plates, which are appropriately formed so as to provide mountings for wheels, drives, engine, and various controls, and also as a feature of the invention to provide enclosures in which the brushes operate and for air filtering facilities. The frame is composed of plates appropriately curved and shaped so as to provide flat surfaces where necessary. No separate frame member as such is used. The frame thus constitutes an enclosure for a horizontal axis transverse and vertical axis brushes. These enclosures are open at their bottoms closely adjacent the surface which is to be swept. The bottom openings are provided all the way around their edges with resilient flaps which extend to or nearly to ground level, as hereinafter explained, so that the open bottomed frame enclosures together with the surfaces being swept form substantially enclosed spaces in which the various brushing elements operate. These spaces are arranged to be evacuated by a suitable suction blower mechanism mounted on the machine. The weldment comprising the enclosure frame has space in it for accumulating the swept material and has an opening at the top rear part of the machine upon which there is superimposed a removable filtering mechanism. The suction blower pulls air from the housing through the filter and in this way fine dust particles are removed from the air stream which is being evacuated from the housing by the suction blower. The preferred form of filter is a multiple bag filter as hereinafter described but other dust separators may be used. According to this invention, the filter is arranged directly over that portion of the enclosure which also serves as a hopper for receiving the swept-up material and the dust that is collected on the filter surfaces may thus be shaken periodically into this collection portion of the enclosure for later periodic removal therefrom. The weldment comprising the enclosure frame also includes dump opening at the lower, rear part of the machine, and this opening is arranged to be closed by a hopper-like lid into which the swept-up material is adapted to fall. This hopper-like lid is mounted on the frame enclosure, so that it can be moved by suitable mechanical linkages powered by hydraulic mechanism for moving the hopper-like lid from a "closed" position in which it closes the dump opening in the weldment, to a "dumping" position in which the hopper-like lid is moved away from the dump opening and swept-up material collected in the enclosure and lodged in the hopper-like lid is dumped for later pick-up by other means.

Features of the invention include means for mechanically shaking down the bag surfaces for relieving them of the accumulated layers of solid particles of dust thereon; a controlled inflow of air into the frame enclosure weldment adjacent the surface being swept, so as to minimize as much as possible any outflow of dust and to minimize streaking which might otherwise occur at brush edges; enclosed vertical axis brushes for sweeping side edges, corners, etc. preliminary to a later sweeping operation by a horizontal axis transversely located rotary brush; full speed operation of all brushes regardless of the propulsion velocity of the machine; a regulated volume inflow of air at a controlled negative pressure within the weldment enclosure in which the sweeping is accomplished, for insuring that dust does not escape even under the most adverse sweeping conditions, and a filtering arrangement capable of handling large volumes of air, and of removing particles of dust even to the size of only a few microns; and complete sweeping under absolutely dry conditions, without any added water for dust control.

Other features of the invention will be apparent as the description proceeds.

Referring to the drawings, and particularly to FIGURE 1A, the frame enclosure weldment includes a front part 10, a rear part 11, horizontal enclosure surfaces at 13 and 14, which form separate pockets at each forward corner of the machine for the vertical axis brushes, a front housing enclosure 15 which contains the engine and various mechanisms, an operating deck 16, seat 17, operator protector shield 18, windscreen 19, and cab 20 (where used).

The weldment which forms the frame enclosure also includes a plurality of interior cross frame plates including panel 21 having a curved lower portion 22 forming a "wrap" around a portion of the periphery of the transverse axis, horizontal, cylindrical brush 100. This cross frame panel bends at 24, and joins the separated panels 37, each of which defines the inner side of a well for one of the rear wheels. Between the panels 37 there is a space closed by panels 34–48 which leaves a wide opening of brush width at the dimension 26 through which the brush discharges the swept material and air passes as shown by arrows 37.

Between points 25—25 the weldment is open and the cross frame panel extends up at the forward point. This opening is closed by housing 28–29 in which a multiple bag filter 30 is contained. The enclosure 28–29 bolts to a flange at line 25—25 and to wall 72 and serves entirely to seal the opening once it is in place.

Along the plane 31—31 there is a rear lower discharge opening 32 which is closed by a hopper-lid, said lid being mounted for movement to a dumping position. From the lower edge portion of this opening 32 the closure plate 34 extends upwardly between the wheels. The heavier portions of the swept-up material passing through opening 26 fall into the collector space formed by the plates 34–34A, the hopper-lid 33 and back plate 11 and the side plates of the machine and the wheel wells 74. The lightweight dust portions of the swept-up material are carried by the flow of air passing through the machine and then are caused to pass through a grid of angles 52 placed side-by-side at the level 54, where, due to a sharp reversal in the direction of flow, caused by the grid, heavier dust is caused to fall out. The dustladen air flows as shown by arrows 38 and passes through the bag filter in a direction from the outside to the inside of the bags. These bags are closed at the bottom and extend from side to side across the machine in the housing 28–29–72 being suitably supported. The dust collects on the exterior surfaces of the bags and the air passes through the bags and then continues in the direction of the arrows 39—39 into the upper part of the filter housing. The air, which at this time is freed from its load of dust, passes into the inlet end of the suction blower 41 and after passing through the blower it is discharged in a rearward direction at the blower outlet 42 as shown by the arrows 43.

The machine frame weldment has side plates for closing all of the areas previously described and there is accordingly provided an open bottomed enclosure in which the brush 100 operates, and in which the blower 41 generates a negative pressure.

The openings in the bottom of the enclosure, through which the brushes sweep are sealed to the surface being swept by flexible rubberlike shields which extend to or almost to the surface being swept. The enclosure formed by the plates 13–14 in which the vertical axis brushes work are skirted by the flexible seals 44. These enclosures in which the vertical axis (front corner) brushes operate are evacuated via two ducts 46 (one at each side of the machine) and the air therein moves as shown by the arrows 47 into the weldment enclosure through openings in the panels 74 at each side of the machine. From the closure plate 34 the curved closure plate 48 returns along the periphery of the brush 100 and terminates at the skirt flap 92 while the lower portion of the plate 22 is provided with a flap at 50. Between these two flaps and at either side of the brush 100 there are flaps 90 and 91.

Therefore, all brushes are operated in enclosures in which a negative pressure is generated. The invention provides a high rate of air inflow into these enclosures. This air inflow is controlled, being of maximum amount along the side edges adjacent the horizontal axis brush 100; i.e. the side edges which are between the front seal 50 and trailing seal 92, see FIGURE 1A. Some inflow occurs under all of the seals, since these are flexible rubber flaps and do not form, and are not intended to form, perfect seals. The inflow of air draws air into the machine housing along with the dust which is lifted by the brushes and the sweep of air into the enclosure helps to draw in swept material which might otherwise be left as a line along the brush ends.

The aforesaid components of the machine are shown in greater detail in FIGURES 1, 2, 3, and 5. Thus, as shown in FIGURE 1, the machine weldment includes a front 10 which includes a grill at 10A for the entrance of cooling air to the motor enclosure and headlights 10B. The horizontal plates at 14, which form the upper ceiling of the enclosures in which the vertical, front corner "gutter brushes" 45A and 45B are adapted to revolve, has a metal skirt 13 to which the flexible skirt 44 is attached. The weldment may also include the slanting front panel 18 or this can be made removable. The windscreen 19 and cab 20 are fabricated as a unit and are bolted in place.

The front panel 18 is smoothly blended into the side panel 15 at each side of the machine. This portion of the machine is somewhat narrower than the rear portion of the machine, as shown in FIGURE 4. At the line 55 there are attached side panels of the machine which extend outwardly at 56 to the curved corner 57 and then rearwardly along each side of the machine at 58—58. These side panels define the width of the machine, at least so far as the rear portion of the machine is concerned. It is noted parenthetically that the widest portion of the machine is defined by the skirt plates 13—13 around the vertical axis brushes at the front of the machine, as shown in FIGURE 6. The side plates 15—15 at the front of the machine extend from the line 55—55 rearwardly along portions 15A—15A to the rear part of the rear wheel wells 60—60 (see FIGURE 6). The rear wheel wells are exposed as cutouts defined by the curved plates 61 (see FIGURES 1 and 2); these curved plates extend around the rear wheels and connect to the lower edges of the plates 15A and 58. This increases the rigidity of the weldment. At the rear of the wheel wells the plates 15 are cut off at the plates 74 and the exterior side plates 58 are cut off by the plane 31—31. At the line 31A on plane 31—31 the rear panel 11 of the weldment extends upwardly to level 25—25 where it is provided with an inturned flange 65 that matches with the flange 66 on the lower edge of the filter housing 28, 29. The flange 65 is carried around on the inside of the side plate 58 for stiffening purposes.

The plates 58 are curved inwardly toward the cab along the line 68 and are cut to match the cross frame closure plate 69.

A vertical plate 72 extends transversely across the machine and forms the front wall for the enclosure containing the bag filter 30 and it is to this wall that the filter housing 28, 29 is attached at its front end. At the lower edge of the plate 72, and extending inwardly from each of the outer plates 58, as far as the inner plates 15A, see FIGURE 11, there are flat panels 74, at each side of the machine. These panels terminate at a bolting flange 74A at the top and are smoothly blended into the lower rear curved portion of the wheel well housing at their lower ends.

The lower portions of the panels 15A in the area 15B inside the rear wheels, see FIGURE 2, form the inner wall of the wheel wells at each side of the machine and these plates extend down to the lower terminal mounting 15C of this wall where axle notches 15D are provided to receive the rear axle 156. Between the wheel wells (inside the machine) there is located the curved plate 48 which follows the periphery of the brush 100. The plate 48 extends upwardly to the line 48A where it is welded to the flat plate 34 which likewise extends between the wheel wells. The lower edge of the plate 34 is provided with a flange at 34A, and this forms the lower front line of the dumping hopper at the plane 31—31.

It will be noted, using FIGURES 1 and 2, that the hopper-lid 33, which closes this dumping opening along the plane 32, includes a lowermost portion 33A which is at the level of the lowermost line 34A of the opening. This is between the wheel wells. The dumping opening extends upward and rearward from 34A to 61B and thence extends outward at line 61B throughout the width of the wheel wells and then upwardly and rearwardly along outer plates 58 to line 32A. The hopper-lid 33 has a portion 33B of shallow depth at each side. To reiterate, the dumping opening 32 has an uppermost rear horizontal line at 32A, it then slants down at each side plate 58 along the line defined by plane 31—31. At the bottom level of 33B the dumping opening has a horizontal line at flange 61A, extending from the outer plates 58 to the inner plates 15B, and thence the dumping opening continues down along the inside of plates 15B along the plane 31—31 to the level of line and flange 34A, and closes to the opposite side along this horizontal line. The hopper-lid closure plate for this opening 32 is correspondingly shaped and is in itself a stiff weldment of plate, provided with a stiffening construction at 191 and with gaskets 194 (see FIGURE 15) all around at the point of closure at plane 31—31.

At the level 54 the flange 65 and the flange 74A, provide a place for bolts by means of which the front and back sheets of the filter enclosure 72 and 28 may be attached. The sheet 72 extends upwardly to the sheet 29 forming the top of the filter housing. The sheet 29 is smoothly curved into the side panels 75—75 of the housing for filter 30. The lower portions 75A of these side panels are hinged at line 54 so that they may be swung open, and they are provided with gaskets so that when closed a reasonably tight fit will be provided against inflow of air into the housing. The rear panel 28 of the filter housing is likewise made so it can be removed and is provided with an access opening 28B which may readily be opened for servicing the filter mechanism from the rear of the machine. When the door 28B is raised, it is easily possible to get the bolts in the flanges 65 and 66. The bolts at the flanges 74A and 72A are accessible from behind the cab.

At each side of the machine there are provided two access panels 58A, one through outer plate 58 and one through inner plate 15, to get at the interior mechanisms of the machine, particularly the brush mechanism, for adjusting the diameter of the brush.

Referring to FIGURES 1A, 2, 12, and 13, the plate 21, which has a lower portion 22 curved around the forward periphery of the brush 100, is provided at its lower edge as mentioned earlier with a seal, collectively designated 50. The plate 22 is provided with a forwardly extending flange 22B which overlays a flange 76B on the plate 76. The plate 76 has a slanting portion at 76A, and an upwardly extending flange at 76C which is bolted onto an angle iron 77 that is an integral cross frame member of the enclosure frame weldment. The angle 77 extends horizontally and transversely across the weldment and is attached into the inner surfaces of the sheets 15 at their lower edges. The vertical flange of angle 77 provides for a line of bolts at 78 which are used for attaching a front flap 80 of flexible rubberlike material, and also for attaching the front flange 76C of the plate 76. The direction of motion of the machine is shown by the arrow 84 and the direction of rotation of the brush 100 is as shown by the arrow 85. The two flaps 80 and 82 serve as the seal 50. Flap 80 at its lower edge drags slightly on the surface which is being swept. The flap 82 is illustrated as made as a double layer and also drags along the surface being swept. The two layers 82A and 82B constituting flap 82 are slitted in staggered positions at 82AA and 82BB as in FIGURE 12A, so the slit in one flap approximately centers between the slits of the other flap. If desired, flap 82 may be a single layer.

One the slanting portion 76A of the plate 76 there is another line of bolts at 86 which serves to hold in place a stiff flap 88 which serves as a baffle to retard to some extent the impingement of swept material against flap 82. Since the brush 100 rotates towards the direction of motion of the machine the swept materials will always accumulate in the space 89 as a roll which is driven ahead of the brush, and which has not yet been picked up and elevated and carried by the bristles of the brush upwardly in the direction of arrow 85 and along the wrap 22. Also, the brush 100 rotates at a fair peripheral speed and tends to produce a local higher air pressure in the area 89, which would tend to throw the swept up material forwardly and under flap 82, were it not for the baffle flop 88 and the plurality of seals effected by the flaps 80 and 82. The flaps 80 and 82 are suspended flexibly to permit a large object such as a brick or a chunk of stone, board, bottle, etc. to pass thereunder and once such debris is brought into engagement with the brush it will in due course be thrown up and around the wrap 22 into the collector portion of the enclosure frame weldment.

At opposite ends of the brush 100 there are located the side flaps 90 and 91 as shown in FIGURE 20. These extend along the sides of the enclosure in which brush 100 revolves and at their forward ends are turned inwardly at 90A and 91A. The front inwardly curved ends are well ahead of the front transverse flap 80 which is in a forward direction ahead of the brush 100. At the trailing side of the brush 100 as shown in FIGURES 2, 13, and 15, there is a downwardly extending flap 92 which is attached by a plurality of bolts to the lower angularly reinforced edge 48B of the plate 48 which wraps around the brush 100. The flaps 90 and 91 and 92 are slightly elevated above the surface being swept whereas the flaps 80 and 82 drag on the surface. As a consequence when the space in which brush 100 is located is evacuated by the action of the suction blower 41, there will be an inflow of air into this space, said inflow being controlled so as to be greater along the side flaps 90 and 91 and rear flap 92 and lesser along the flaps 80-82.

Referring to FIGURES 1, 2, 13, and 20, the lower edge of the vertical plate 13, which defines the front and front corner space in which the vertical axis "curb" brushes operate, is provided with a series of bolts to which the solid portion of the flexible flap 44 is attached. This flap is relatively much wider in a vertical direction than the flaps 80 and 82, 90 and 91, and 92 and at the lower edge of the flap 44 there is provided an extra outer layer 44A which is held in place by the clip-bolt assemblies 44B. These assemblies are of short lengths so as not appreciably to interfere with the general flexibility of the flap 44. Accordingly the flap 44 is two-ply at its lower surface in area 44A and these plies are slitted, the slits of the outer ply being staggered with respect to the slits of the inner ply too so that the slits of the outer ply come at approximately the middle of the spaces between the slits of the inner ply. The portions 44C—44C of the flap 44 which are on the sides of the machine are not slitted and they are single plies, and these portions extend rearwardly and are then brought in along the angularly disposed lines 44D and 44E, as shown in FIGURE 20 and close against the lower edge of the outer panels 58 and against the outer surfaces of the side flaps 90 and 91, see FIGURES 1 and 20.

There is accordingly an enclosed space at the forward end of the machine ahead of the flap 80 and within the flap 44, which is closed horizontally by the plate 14 of the enclosure-frame weldment. It is in this space that the two upright-axis brushes 45A and 45B are adapted to operate, it being noted that the plate 14 is provided with an aperture at 14A at each side through which the operating spindle of the brush is adapted to pass. This opening is preferably closed by a flexible cover, not shown, so as to prevent excess inflow of air through these openings. Within this space, and below the plate 14 the weldment includes several vertically disposed steel plates 94—94 supporting heavy rubber flaps along their lower edges which serve as shields against which the debris raised by the brushes 45A and 45B is thrown. The brushes 45A and 45B rotate in the direction of the arrows shown on them in FIGURE 20. That is to say the front portion of each brush rotates toward the center line of the machine and the material which is swept is accordingly projected by the brushing action toward the center line of the machine. The plate 94 supported flaps serve to form a surface against which such swept material is impinged so that it will be discharged along lines 94A—94A and will not be deposited in a position where it would be run over by the front wheel 95 of the machine, which also works in the enclosure within the skirt 44. The material swept by the brushes 45A and 45B is thus discharged as two windrows separated by the space between the lines 94A and 94A. The horizontal axis transversely located brush 100 is thus located so as to sweep up the sweepings preliminarily gathered by brushes 45A and 45B.

Referring to FIGURES 2, 11, 13, and 14, in the space between the vertical plates 15 and 58, at each side of the enclosure frame weldment, see FIGURE 11, there is an opening into which is placed a suction duct 46, one duct being placed in such space at each side of the machine. The front end of this duct is covered by a screen 96 and the duct is shaped so as to extend rearwardly and is then connected to a flexible hose 98 which extends upwardly and through a terminal discharge nozzle 99 located on the two slanting plates 74—74 which at a rearward portion of the machine close the space between the plates 15 and 58. These nozzles 99 are shaped so that the discharge is in a generally upward direction. The nozzles 99 are within the enclosure of the weldment which is evacuated, that is to say that the enclosure in which brush 100 operates and in which the swept up material is collected and the filtering arrangement 30 is located. Consequently the state of evacuation existing in this enclosure causes air to be drawn through the ducts composed of tubes 98 and outlets 99, the air flowing from the enclosure within the skirt 44, at the front of the machine, in which the brushes 45A and 45B operate. The degree of evacuation within this front enclosure within skirt 44 and the quantity of air drawn into and from it, are not as great respectively as the degree of evacuation in and quantity of air drawn into and from the enclosure in which brush 100 is contained. This is appropriate because brushes 45A and 45B are smaller and do not raise as much dust as brush 100. Furthermore, only one of the brushes 45A or 45B may be operated.

In the form of power sweeper herein exemplified the sweeping width W (see FIGURE 20) of the broom 100 is 48 inches and the radius of each of the gutter brooms 45A and 45B is 16". The total effective sweeping width is 88".

According to this invention the source of vacuum is connected to the main enclosure in which the main broom 100 is situated and the degree of vacuum is accordingly a maximum in this enclosure. A lesser degree of vacuum is drawn in the enclosure in which gutter brooms 45A and 45B operate. The volume of air handled through the enclosure in which the gutter brooms operate is about 20 to 30% of the total volume, preferably about 25% of the total volume. This volume (through the gutter broom enclosure) is regulated, in the design, by the amount of design clearance under the skirt 44 (for level road operation) and by the size of the communicating passageways 98–99 through which this volume of air is withdrawn.

In respect to the main enclosure, the volume of air withdrawn therefrom by the vacuum blower 41 is replaced partially by (1) the inflow (via ducts 98–99 on both sides) from the gutter broom enclosure and (2) the inflow under skirts 80A and 82, 90 and 91, and 92, which form the open-bottomed rectangular enclosure in which brush 100 operates (see FIGURE 20). According to this invention these skirts are set so as to provide a maximum velocity inflow under the skirts 90 and 91 and 92 and, preferably, minimum velocity of inflow under skirts 80 and 82. The clearance settings are preferably as follows: Skirts 80 and 82 are both set to drag the surface; hence, when going over irregularities the inflow along this (forward) side of the rectangular opening is minimal. The clearance under skirts 90 and 91 is made less than under skirt 92, preferably 30% to 60% of the clearance under skirt 92. Thus, when the (level road) clearance under skirt 92 is ½", the clearance under skirts 90 and 91 is made about ¼". The velocity (and volume) of flow through the clearance space under skirt 92 is opposed by a locally high pressure in the space 92A, which is the space between skirt 92 and the line of contact of the bristles of brush 100 and the surface being swept. In this region the bristles of the broom move downwardly toward the ground and have a relatively strong "fan action," which tends to build up a locally high pressure in this space 92. By making the inflow clearance space under skirt 92 greater than the inflow clearance spaces under skirts 90 and 91, a balance is achieved.

The total clearance area under skirts 90, 91, and 92, for a level sweeping condition can easily be calculated by multiplying the (designed) height of the clearance by the length thereof. The capacity of blower 41 is chosen, so that (after due allowance is made for the pressure drop through the filter 30) there will be provided an air inflow of about 30 to about 70 cubic feet of air per minute for each square inch of clearance opening under the skirts 90, 91, and 92. An air inflow of 55 cubic feet per square inch gives good results. The inflow under skirt 92 and the sum of the inflows under skirts 90 and 91 is, so far as can be determined, approximately equal. In respect to this calculation the air inflow through ducts 98–99 is first deducted and the air inflow under the (front edge) skirts 80–82 is neglected.

By utilizing the foregoing principles, a relatively higher velocity air inflow under skirs 90 and 91 is achieved, and this minimizes deposits of swept material that are left as a line along each side of the brush 100, even though this brush is utilized for sweeping to its full width. The high velocity inflow blows inwardly the material which would otherwise dribble among the ends of brush 100. Also, the total air inflow is such that no dust is projected outwardly under any of the skirts, so no dust is raised in the sweeping operation.

Referring to FIGURES 1, 2, 4, 6, 13, and 14, the vertical axis brushes 45A-45B are mounted for slight tilting movement and for rotation and for up and down movement as follows:

At each side of the lower portion of the front panels 15 there is mounted a bracket 101, these brackets being the same except that one is a righthand bracket and one is a lefthand bracket. The brackets have arms 101A and 101B extending outwardly so as to provide a horizontal axis at 102, this axis being in a horizontal plane and slanted towards the center of the machine in a forward direction when viewed in plan. A gear housing 104 has trunnions 104A and 104B pivotally supported in the arms 101A and 101B respectively on axis 102. The brush is supported on a vertical spindle through this housing and may accordingly swing in a plane normal to this mounting axis 102. The housing 104 has an angle gearing therein connected so as to be driven by the shaft 106 through the universal joint 108 from the driving shaft 109 which connects through another universal joint 110 to the shaft 111 which is driven by chain and sprocket 112 from the drive shaft 113 supported on frame pieces 113A. The housing 104 is provided with a rearwardly extending arm 104C having an adjustable stop screw 104D which bears on bracket 101 and causes the axis of the brush to be held in a certain, nearly vertical, adjusted position. The rotation of the brushes is such that the upper end of the brush spindle tends to be moved toward the centerline of the machine and the stop 104D holds the housing and hence the brush in its adjusted position. Yet the brush is able to swing inwardly if it encounters an obstruction such as a curb.

A hydraulic cylinder contained within the housing 115 is used for raising and lowering the spindle of the brush. Either one or both of the brushes 45A-45B may be elevated so as to be kept out of contact with the surface being swept. Also, as the bristles of these brushes wear the hydraulic mechanism may be used for lowering the spindle so that only a prescribed bristle pressure is exerted.

Referring to FIGURES 3 and 6-10, the power source, preferably an internal combustion engine is shown at 116. The output of the motor is taken through the angle gear box 118, which can be a gear reduction type depending upon the speed-torque characteristics of the motor 116. The gear box 118 has two output shafts 119 and 136. At the upper part of FIGURE 6 the output shaft 119, which is also shown in FIGURE 3, extends outwardly and is provided with a drive sprocket 121 and V-belt pulley 122, keyed together. The pulley sprocket is provided with a self-contained clutch mechanism generally designated 120 which is operated by means of a shaft 126 extending up to the operator handle 123. When the clutch is engaged the sprocket 121 and the pulley 122 are rotated by the shaft 119. When the clutch is disengaged both the sprocket and the pulley will stand still.

Sprocket 121 operates brush shaft 128 of main brush 100. Pulley 122 operates blower 41. Thus, around the sprocket 121 there extends a chain 124 which runs over the sprocket 125 (which drives the gutter brooms 45A and 45B) on the shaft 114 and thence downwardly around the sprocket 127 on shaft 128 (which drives the main broom 100) and thence over an idler sprocket 129 and finally returns to the drive sprocket 121. Around the drive pulley 122, which is of the V-belt type, there is placed a V-belt 130 which runs over the drive sheave 131 of the suction blower 41 and thence returns over the idler pulley 132 which is held in the direction of arrow 134 so as to maintain proper belt tension by fixed positioning linkage.

The shaft 114 previously referred to extends back into the machine and through a suitable drive chain 135 drives the shaft 111, which supplies power to the forwardly located vertical axis brushes 45A and 45B. The shaft 128 is the spindle for the horizontal axis transversely located brush 100.

From the angle gear box 118 the shaft extends at 136 and is provided with a V-belt drive pulley 138 for auxiliaries, as will be explained. The shaft 136 is then coupled by a flexible coupling 139 to the input shaft 140 of an infinitely variable speed changer 141. This unit has a control lever 142 for changing its "gear ratio" in one extreme position (i.e. "stopped") to operate its self-contained disconnect clutch. The lever 142 is coupled through the linkage 143 to the foot pedal 144 which may be rocked to shift the "gear ratio" of the device 141.

The pedal 144 is of a size that the entire foot of the operator can be placed on it and the pedal can then be rocked in the direction of the arrow F, as shown in FIGURE 8, by pressure of the toe portion of the foot and can be rocked in the direction of the arrow S by pressure of the heel. Increased pressure and rocking of the pedal 144 in the direction of the arrow F regulates the speed changer 141 to decrease the "gear ratio" and hence the propulsive speed of the entire vehicle is increased. The pedal 144 can be held in any position and the particular gear ratio of the speed changer 141 will then be appropriate to that position. When the pedal 144 is rocked in the direction of arrow S, it finally reaches a position such that the gear ratio of the speed changer 141 is infinite, i.e. the velocity of the vehicle is zero and when reaching this position the actuation of pedal 144 and hence of the lever 142 has the effect of operating a self-contained clutch 147 which is a part of the speed changer mechanism 141. When this occurs the output shaft 145 is disconnected and gear box 146 may be freely shifted to any of the selected forward or reverse gears.

The output shaft 145 of the variable ratio drive 141 is connected to the conventional gear box 146 having several forward and at least one reverse gear, terminating in an output shaft having thereon a double drive-sprocket 148. This double drive sprocket is connected to a double drive-sprocket 149 by means of the roller chain 150. The shaft generally designated 151 extends across the vehicle and consists of an outer tube 151B having a solid shaft 151A rotatably therein (see FIGURES 3 and 6). The outer tube 151B is journalled in the frame, the inner shaft journals therein. The inner shaft extends through and serves as a hub for the differential housing 157. The differential power input is made through sprocket 149 which is keyed to the differential housing 157. The differential housing has two outputs, one consisting of sprocket 152B which is keyed to the outer tube 151B of the cross frame shaft; the other output is keyed within the differential housing to the inner shaft 151A which extends across the frame and at its far end has the sprocket 152A thereon. The power flow is hence from chain 150 to sprocket 149, thence through differential 157 to the outer tube 151B and its sprocket 152B and to the inner shaft 151A and its sprocket 152A. The shaft 151A and outer tube 151B stiffen each other.

The two differential outputs provide the propulsive force for the vehicle. The rear wheel axle 156 is stationary and is supported on the machine frame weldment, as shown in FIGURE 13 by means of stationary hub 158 which is bolted into an upwardly extending notch 159 in the lower terminal edge 15C of the inner plate 15 of the weldment. If desired the axle may be secured by additional clips, not shown. The rear wheels 189 and 190 are journalled on opposite ends of the axle 156. Each wheel has a sprocket 154A or 154B which is connected by chain 153A or 153B to the drive sprockets 152A or 152B.

Accordingly, when the engine is running, and when the gear box 146 is in gear (either forward or reverse), and when the pedal 144 is moved "Forward" with toe pressure the transmission 141 will be controlled so as to transmit force to put the vehicle in motion, at a speed ("gear ratio") appropriate to the position of pedal 144. By changing the position of foot pedal 144 the "gear ratio" and speed of the whole vehicle can be varied. The motor 116 is governed so as to run at a constant speed.

Referring particularly to FIGURE 17 and 20, the vehicle has, preferably, a single wheel 95 in front, which is supported on a fork 160 that is in turn journalled on the spindle 161 set in the bearing 162 in the frame weldment. The spindle 161 has a side arm 164 extending to one side, provided with a ball joint 165. Attached to the ball joint is the end of piston rod 166 of the hydraulic steering cylinder 167, the base (cylinder) of which is attached by a suitable fitting 168 to a ball 169 on the bracket 170 that is in turn attached to the frame plate 171. The cylinder 167 has two hydraulic lines 172 and 174 that are connected to opposite ends of a control valve body generally designated 175. The control valve has a hydraulic pressure input at 176 and a hydraulic return line at 177. One end of the control valve body 175 is mechanically connected by the rod 178 to a ball joint 179 mounted on a side arm 180 formed on the fork 160 which supports the front wheel. This provides a follow-up control whereby the position of the steering fork 160 determines the position of the valve body 175. The operating spindle 181 of the control valve is connected by a suitable fitting 182 to a ball joint 183 on the steering lever 184 which is swung arcuately in one steering direction or the other as shown by arrows 185 by rotation of the steering wheel 186. When the wheel 186 is turned the valve 175 is moved appropriately to apply pressure from the hydraulic supply 176 to either one or the other of the lines 172 or 174 depending upon the direction that the wheel 186 is turned. This causes corresponding actuation of the hydraulic cylinder 167, which being anchored at the ball 169, and attached to the side arm 164 of the spindle of hte front wheel, accordingly moves the front wheel to steer it, in a direction corresponding to the direction which the wheel 186 is turned. As the front wheel is thus steered it will, by means of the linkage 179–178 cause movement of the body of the valve 175 so as gradually to close off the valve, and thus hold the front wheel in a position corresponding to the position of the arm 184, which is connected by gearing to the wheel 186. In this way steering is accomplished hydraulically in either direction.

If desired the hydraulic steering apparatus may be dispensed with. For this purpose the linkage 178, 175, 181 is replaced by a solid link connecting the ball 183 and the ball 179, and the linkage 165–168 is not used.

The wheel 95 is so constructed that it can be turned through a wide angle in either direction. The wheel base between the position of the front wheel 95 and the rear wheels 189–190 is very short and accordingly the entire vehicle can be turned in a tight circle. Conventional brakes are provided on the rear wheels and if desired, individual wheel brakes may be provided for each of the wheels 189–190 and may be used in conjunction with steering for making very tight turns of short turn radius.

Referring to FIGURES 15 and 16, particularly, the hopper-lid 33 is provided at its uppermost edge with a stiffening angle 191 the terminal flange of which is in the plane 31—31 which defines the opening in the rear lower portion of the weldment comprising the frame and the housing of the machine. The dumping opening is provided all around its periphery with a shallow channel 192 with the flanges outward, in which the gasket 194 is adhesively seated. The edge of the hopper-lid seats against this gasket in the closing position. The support for the hopper-lid is provided by a pair of arms at each side of the machine. These pairs are identical and are inside the enclosure provided by the frame encloseure weldment. Each pair of arms includes an operating arm generally designated 195 and the follower arm generally designated 196. The operating arm 195 is mounted for pivoting movement on the pivot 197 attached to the weldment. Arm 195 is bent as shown in FIGURE 15, and at its lower end 195A has a pivot 198 connected to the bracket 199 on the inside of hopper-lid. The upper end 195B of the arm 195 is provided with an actuating pivot 200. The follower lever generally designated 196 is shaped as shown in FIGURE 15 and has a short end 196A connected to the pivot 201 attached to the weldment and a longer end 196B attached by pivot 202 on the inside of the hopper-lid. The follower arm 196 also has a bent end 204 extending beyond the pivot 202 which forms a stop as shown by dotted lines, in FIGURE 15. The pivot 198 of the actuator arm moves along a path of movement as shown by the arc 205, whereas the pivot 202 of the follower arm moves laong a path as shown by the arc 206. The difference in radius of these arcs provides a dumping action. When the actuator arm 195 is moved the hopper-lid is first moved so that its edge is disengaged from the gasket 194 and then, as the movement of the arms 196–195 is continued, the hopper-lid is swung to the dumping position shown in dotted lines in FIGURE 15. The limit of movement is established by the end 204 on the arm 196 which engages the rear surface 11 of the weldment.

The weldment at the level of lines 25—25 is provided with an inturned seating flange 65 on which the cover 28–29 of the filter housing is seated and this flange is stiffened along each side by an internal, downwardly extending flange 208, as shown in FIGURES 15 and 16. The flange at level 25 is provided with an aperture at 209. Below the flange at level 25 the condition within the machine is dusty due to the swept particles entrained in the air that is passing through the machine, but above the flange 25, a space is provided for cylinder 221 in which the air is relatively clean. In order to avoid a flow from the lower dirty conditions below the flange at level 25 through the aperture 209 there is provided a flexible gasket at 210. Below the level of the flange 25, at opposite sides of the machine, and transversely thereacross there is provided in the space between the side plates and flange 208 a pivot bracket 211—211 which is attached by bolts to the surfaces of plate 58 and flange 208. This bracket 211 serves to support the pivot pin 212. There is, of course, one such pivot at each side of the machine, and these pins 212 are axially aligned. On each of the pivot pins there is an operating bell crank generally designated 214. This bell crank has one lever 215 having a plate portion 215A having an arcuately curved edge 216 which extends from the point 216A to the point 216B and a second lever 226 which is also in the form of a plate 226A having an arcuate edge 225 extending from the point 225A to the point 225B. The arc between these two points 216A and 216B is a smooth surface about the axis of the pivot 212. To the right of the point 216A as shown in FIGURE 15, arm 215 extends and at its outer end is provided with the pivot 218 which is attached to the clevis end of a piston rod 220 which works in the double acting hydraulic cylinder 221. The end of the cylinder 221 is pivotally attached to the pivot 222 that is mounted on the bracket 224 formed on the frame enclosure weldment. The arcuate edge 225 has a radius less than that of edge 216 but the whole bell crank 214 is cut from a plate of uniform thickness and hence portions 215A and 226A have smooth outer faces. The gasket 210 is made so that it neatly seals against the faces of the plate portions 216A and 226A of crank 214 and also so as to seal against the arcuate edges 216 and 225. The lever 226 is provided with the pivot 227 that is connected by the adjustable length link 228 to the pivot 200 on the operating arm 195.

The hydraulic cylinder 221 is provided with hydraulic lines 221A and 221B. By applying pressure through one or the other of these lines, the piston 220 may be forced rearwardly (to the left as shown in FIGURE 15) or forwardly, and this in turn causes the rotation of the operating bell crank 214 and accordingly causes the actuation of the arm 195B of the operating arm 195 which finally causes the hopper-lid to be moved along a path as guided by lever 196, from the "closed" condition as shown in full lines in FIGURE 15 to the "dumping" condition shown in dotted lines in FIGURE 15, and vice versa. By adjustment of the link 228, the hopper-lid can always be brought to a tight closing position against the gasket 194.

Referring to FIGURES 1A, 2, 18, and 19, particularly, the housing 28–29 is provided at each side with a reinforcing flange 229, see FIGURE 18, and the sidewall and rearwall of this housing extend upwardly and are smoothly rounded so as to form the cover 29. The cover is made so as to hinge at 28A, the hinge being mounted on the rearwall of the unit. At the level of hinge 28A the housing is in effect provided with a separation plate. This separation plate takes the form of a plurality of cross frame bars 230 which are spaced at uniform distances from each other so as to provide uniform spaces therebetween and these bars all have a common upper surface. Along the top of each bar there are upwardly protruding pins 231. At opposite sides of the machine the space between the bars 230 is closed off throughout the width of the dimension C, see FIGURE 18. The bars 230 accordingly present narrow slots extending across the machine for the width of the housing 29 less the dimension C at each side of the machine and throughout this width there are provided the pins 231.

In each of the narrow slot-like spaces between successive bars 230 there is hung a flat filter bag, generally designated 30. Since all of these bags are the same, only one need be described. Each of the bags 30 has a pair of sides 30A and 30B which are preferably composed of a single piece of cloth folded about the lower edge 30C. At the top each of the sides is provided with a hem forming a little heading in which a wire 232—232 is placed. This hem is folded over the top of the adjacent bar 230 and apertures are provided so that the pins 231 can stick up through the cloth. The wires are anchored behind the pin and hence hold the hem straight and firmly fasten the walls 30A and 30B of the bags at the top. A similar pin 233B is provided at each end of the slots between the bars 230 for anchoring the edges of the filter bag. Between the panels 30A and 30B, at the bottom of the bag, there is a space bar 234 in the form of a sheet metal tube having a smoothly curved bottom. Each of the bars 234 has fastened to it a central pin 235, which is at the centerline of the bag. At a distance inwardly from each edge of the bag, each bar 234 is provided with a holddown pin 236 which is apertured to receive the upper hooked end of the spring 238, the lower end of the spring being attached to an anchoring eye 239 carried on an angle iron bar 240 that extends longitudinally of the machine within the filter housing. It will be understood that the filter cloth forming the panels 30A and 30B simply bends around the lower surface of each of the bars 234. Apertures are provided through the portion of the filter cloth at the bottom of the bar so as to permit the two holddown pins 236 (one on each side of the machine) and the center pin 235 to pass through the filter cloth. According to this invention, sufficient filtering area is provided by the bags 30 so that the volume of air exhausted from the enclosure frame weldment by suction blower 41, as expressed in cubic feet of free air per minute divided by the total square feet of filter area of the bags 30, will provide a (quotient) factor of less than 6, and preferably a factor of 4 or 5. Thus, in an exemplary machine embodying our invention, the total volume of air exhausted was 2500 cubic feet per minute and by providing a filter area of approximately 600 square feet the resultant quotient factor was 4.16. By constructing the bags of woven cloth, exceptional results were obtained. Dust particles down to 5 microns and less were removed.

Within the housing, at the rear part of the machine there is provided a bracket 241 on which there are a pair of spacers 242—242 forming a support for a bar 244 which is held in place by cap screws. The space between the bar 244 and the bracket 241 and between the spacers 242—242 forms a slide bearing in which the rear end of a shaker bar 245 is adapted to reciprocate. The shaker bar is of rectangular cross-section and is provided with apertures into which the center pin 235 of each of the bars 234 (for each bag) are adapted to project downwardly. The front end 245A of the shaker bar is made of round cross-section and passes through a seal 243 in the front wall 72 of the housing. Outside of the housing the end 245A of the shaker bar is connected through a flexible connector 247 (which is simply a fabric cloth universal joint not used for rotation), to the reciprocating shaft 246 which is supported for sliding movement in bearing 248, which is mounted on the weldment at 253. The shaker bar assembly 245, 245A, 247, 246, does not turn but only reciprocates and the flexible connection 247 is provided so as to allow for slight misalignment and also to provide some resiliency in the reciprocating movement. The front end 246 of the shaker bar is provided with a clevis at 249 which in turn provides a pin connection at 250.

The mechanism for actuating the shaker bar can be a mechanical drive or a hydraulic drive. A mechanical drive is illustrated best in FIGURE 9 and 10. Upon the output shaft 136 of the angle gear box 118 there is provided a V-belt pulley 251 which, through the belt 252 drives the shaker pulley 254 on the shaft 255 that is journalled in the bearing 256 mounted on the same bracket assembly 253 that also supports the slide bearing 248 of the shaker shaft assembly. On the shaft 255 there is provided an eccentric hub 258 to which the crank end 259 of the connecting rod 260 is attached. The connecting rod 260 is coupled by means of the pin 250 to the clevis 249 on the shaker shaft 246.

The pulley 254 is not keyed to the shaft 255 but drives the shaft through a self-contained clutch 259 which may be operated so as to move the clutch to "driving" or "disengaged" condition by movement of the actuator 263. Actuator 263 is provided with an operating shaft 261 accessible to the operator. When the clutch is moved to an "engaged" condition, the pulley 254 drives the shaft 255 and hence moves the connecting rod 260 and this in turn moves the shaker shaft assembly 245, 245A, 247, 246, back and forth in the direction of the double arrow 285, thereby moving the shaker bar 245 backwardly and forwardly at a rapid rate. This shaking motion is communicated by pins 235 to bars 234 and hence to the filtering surfaces of each of the filter bags 30 thus causing them to dislodge the accumulated layer of dust thereon.

In place of drive pulley 251 on power shaft 136 there may be substituted a small standard hydraulic motor with an output pulley.

By referring to FIGURES 1A and 2, particularly, it will be noted that the dust will fall downwardly and strike either the inclined walls 74, (which are at the outer portions of the hopper space) or will fall on the inclined panel 34, which terminates at the edge 48A. In either case, the dust will be shaken down and when falling down will thus accumulate in the hopper chamber for later removal when the hopper-lid 33 is moved into the dumping position.

Within the space between each of the panels 30A and 30B forming each of the bags, there is placed a spreader framework of light gauge wire for the purpose of holding the panels 30A and 30B spaced apart. The rearmost spreader 262 (at the left in FIGURES 2 and 19; also shown in FIGURE 18) is illustrated in the raised position, but it will be understood that in their normal position position the spreaders are approximately flush with the tops of the bars 230 and at the bottom rest upon the lower bars 234. The spreaders serve to maintain the two panels 30A and 30B of each of the bags in approximately planar condition regardless of the fact that the airflow is from the outside of the bag to the inside of the bag and hence tends to push these panels toward each other.

The airflow into the filter bags is as shown by the arrows 264 in FIGURE 19. The dustladen air passes between the panels of adjacent bags and thence, after entering the bag passes upwardly in the space between the sidewalls of the bag. The air then flows through the filtering material of the bag and into the space between the panels of each bag, this space being defined by the spreader 262. The filtered air continues upwardly and outwardly as shown by the arrows 265 and into the header space 286, see FIGURES 18 and 19. The flow then continues via arrows 266 forwardly in respect to the machine and thence into the inlet ductwork 267 connected to the suction blower 41 from which the flow is ejected through the exhaust nozzle 42 as shown by the arrow 43, see FIGURE 1A.

On the back panel 28 of the filtering housing there is a small lower access door 268 which may be opened for servicing the shaker bar mechanism and the springs 233 at the bottom of the bags. The upper portion of the housing 29 is provided with a flange and gasket all around as at 29A so that it seals neatly with the sidewalls of the housing. Each of the sidewalls of the housing is provided with an access door 75A which may be detached so as to expose the filter bags 30 as shown in section in FIGURE 19. A flat bristle brush may be run back and forth between the filter bags for cleaning off accumulated dust which is not dislodged in the shaking operation, aforesaid.

The horizontal axis brush 100 is made so that its diameter fits with slight clearance within the curved portions 22 and 48 of the several shields defining the housing in which the brush operates. The brush 100 is preferably made so that the tips of the bristles of the brush can be held at a constant diameter by adjustment, so that the clearance between the tips of the bristles and the insides of the curved plates 22 and 48 may be maintained substantially constant during the life of the brush. The brush utilized in this machine may be constructed as set forth in our co-pending application entitled Adjustable Diameter Cylindrical Brush, Ser. No. 794,065, Filed Feb. 18, 1959; now Patent No. 3,023,440.

In FIGURES 21 and 22 there is shown a modified form of the invention wherein, in place of the bag-type filter illustrated with reference to FIGURES 1-20, there is provided another filtering mechanism generally designated 270. This filtering mechanism includes a housing 271 provided with a separate fan chamber at 272, having an annular opening 272A therein defined by the circular flange 272B. On the end walls 274 and 275 of the housing 271 there are journals which serve rotatably to support the shaft 276 on which there is mounted a cone-shaped rotor 277 having an end 278 which is composed of radially disposed fan blades. The opposite end of the cone-shaped rotor extends into the circular space defined by flange 272B. A fan 279 within the space 272 exhausts into the main enclosure defined by the weldment and in which the brush 100 is adapted to operate. The housing 271 is provided with a tangential inlet 280, see FIGURE 22, which extends from the upper part of the dust hopper and runs tangentially into the housing 271, which being circular in shape allows the incoming air to circulate, cyclone fashion within the housing. At the opposite end of the housing 271 there is provided a secondary outlet 281 which is provided to allow the heavier portions of dust and accumulated debris entering the housing through the tangential inlet 280, to be ejected directly into the dust bin. The shape of the conical rotor 277 and the effect of the radially disposed fins 278 by which the rotor 277 is supported serves to separate the dust particles, which are also ejected via outlet 281. The cleaned air may be discharged to atmosphere or some may be returned via duct 282 to the housing to brush 100, as shown by arrows 283 in FIGURE 22 by regulating the damper shown.

In FIGURE 23, there is shown a further modification similar to that described with reference to FIGURE 1-20, except that the vertical axis "gutter" brushes at the front corners of the machine are eliminated, and the machine is not provided with an operator cab 20. Otherwise, the mechanism shown in FIGURE 23 is entirely the same as that illustrated with reference to FIGURES 1-20.

As many widely apparently different embodiments of this invention may be made without departing from the spirit and scope thereof, it is to be understood that we do not limit myself to the specific embodiments herein.

What is claimed is:

1. A power sweeper comprising a mobile frame having a longitudinal axis for normal straight forward motion, front and rear wheel means on the frame for propelling and steering the frame, the front wheel means being located on the longitudinal axis of the sweeper, power means connected through a transmission to at least some of said wheel means for operating the same, a main enclosure on the frame and a vacuum blower connected to the power means so as to be driven thereby and connected to the main enclosure for partially evacuating the main enclosure, said main enclosure having a main opening in the bottom thereof and located between the wheel means, said opening extending transversely across the frame, a substantially horizontal axis cylindrical brush and drive means connecting it to the power means, said brush being mounted on the frame for brushing engagement through said opening against the surface on which the sweeper moves, said sweeper also having thereon at least one gathering brush connected to the power means so as to be rotated thereby and mounted for rotation about a generally upright axis at a location along a side of the machine and in a position in advance of the cylindrical brush when the sweeper moves forward, and a separate open bottomed enclosure around said gathering brush, said separate enclosure being closed except at the bottom and connected to the main enclosure so as to be partially evacuated when the main enclosure is partially evacuated, said gathering brush and front wheel means both being located in said separate enclosure.

2. A power sweeper comprising a mobile frame having a longitudinal axis of normal straightforward motion, propulsion wheel means and steering wheel means on the frame, power means connected through a transmission to the propulsion wheel means for operating them, a main enclosure on the frame and a vacuum blower connected to the power means so as to be driven thereby and connected to the main enclosure for partially evacuating the main enclosure, said main enclosure having a main opening in the bottom thereof and located between the wheel means, said opening extending transversely across the frame, a substantially horizontal axis cylindrical brush and drive means connecting it to the power means, said brush being mounted on the frame for brushing engagement through said opening against the surface on which the sweeper moves, a separate open bottomed enclosure across the sweeper and extending from side-to-side in respect to the sweeper and from a position behind to a position ahead of the steering wheel means, said steering wheel means being positioned within said separate enclosure and symmetrically in respect to said longitudinal axis and a pair of gathering brushes located within the separate enclosure on opposite sides of the steering wheel means, each of said brushes being rotatable about an upright axis and in a direction so as to sweep towards the longitudinal axis of the sweeper, and duct means connecting the separate enclosure to the main enclosure for partially evacuating the separate enclosure when the main enclosure is partially evacuated.

3. The sweeper specified in claim 2 further characterized in that baffle means is provided within the separate enclosure on opposite sides of the wheel means therein for impeding deposition of materials swept by the gathering brushes at a position in front of said wheel means.

4. The sweeper specified in claim 2 further characterized in that the main opening and separate enclosure are each provided with a flexible skirt therearound extending from the edge of the opening to a position proximate the surface being swept, the portion of said flexible skirt on the forward side of said opening and enclosure being composed of double layers of slitted flexible material.

5. In a power sweeping machine, a frame having thereon propulsion wheels and steering wheel means, an engine and transmission connecting the engine to the wheels for driving them forwardly and rearwardly and means for steering the steering wheel means, said machine being characterized in that there is provided on the frame an enclosure capable of being partially evacuated and a vacuum blower on the frame connected to the engine so as to be driven thereby and having its inlet connected to the enclosure for drawing air therefrom, said enclosure having a rectangular opening on the bottom parallel to and slightly above the surface to be swept, said opening being between the wheels and extending transversely to the normal direction of sweeping motion of the frame, partial cylindrical walls extending upwardly from said opening, a cylindrical brush mounted for rotation about an axis above and parallel to the rectangular opening, said brush being of a diameter in respect to the opening so that the tips of the bristles sweep down through said opening and into engagement with the surface being swept, power transmission means connecting the engine and the brush for rotating it in a direction so that the bristles in contact with the surface being swept move in the forward direction of propulsion of the vehicle, a refuse hopper within the enclosure behind the cylindrical brush, a solid-air separator in the enclosure directly above the refuse space and in the path of flow of air withdrawn from the enclosure by the suction blower, a flexible skirt completely around said rectangular opening, the portion of the skirt on that side of said opening which is toward the direction of forward motion of the machine being of a size such as to drag into contact with a flat surface over which the sweeping machine is propelled and located close to and generally parallel to the path of motion of the bristle tips, another shorter flap between said portion of the skirt and the path of motion of the bristle tips, the flexible skirts along the sides of said rectangular opening which are in the direction of motion of the machine, and along that side which is away from the direction of motion being set respectively, in successively greater spaced relation to said flat surface over which the sweeping machine is propelled.

6. In a power sweeping machine, a frame having thereon propulsion wheels and steering wheel means, an engine and transmission connecting the engine to the wheels for driving them forwardly and rearwardly and means for steering the steering wheel means, said machine being characterized in that there is provided on the frame an enclosure capable of being partially evacuated and a vacuum blower on the frame connected to the engine so as to be driven thereby and having its inlet connected to the enclosure for drawing air therefrom, said enclosure having a rectangular opening on the bottom parallel to and slightly above the surface to be swept, said opening being between the wheels and extending transversely to the normal direction of sweeping motion of the frame, partial cylindrical walls extending upwardly from said opening, a cylindrical brush mounted for rotation about an axis above and parallel to the rectangular opening, said brush being of a diameter in respect to the opening so that the tips of the bristles sweep down through said opening and into engagement with the surface being swept, power transmission means connecting the engine and the brush for rotating it in a direction so that the bristles in contact with the surface being swept move in the forward direction of propulsion of the vehicle, a refuse hopper within the enclosure behind the cylindrical brush, a solid-air separator in the enclosure directly above the refuse space and in the path of flow of air withdrawn from the enclosure by the suction blower, a flexible skirt completely around said rectangular opening, the portion of said skirt on that side of the opening which is toward the direction of forward motion of the sweeping machine being of a size such as normally to drag in contact with a flat surface over which the sweeping machine is propelled, the portion of said skirt which is on that side of the opening which is away from the direction of forward motion of the sweeping machine being spaced a maximum distance above the flat surface over which the sweeping machine is propelled and the portions of said skirt on the sides of said rectangular opening which are parallel to the normal direction of forward motion being spaced from said flat surface but at a lower level than the spacing of the skirt on that portion of the rectangular opening which is away from the direction of forward motion.

7. In a power sweeping machine, a frame having thereon propulsion wheels and steering wheel means, an engine and transmission connecting the engine to the wheels for driving them forwardly and rearwardly and means for steering the steering wheel means, said machine being characterized in that there is provided on the frame an enclosure capable of being partially evacuated and a vacuum blower on the frame connected to the engine so as to be riven thereby and having its inlet connected to the enclosure for drawing air therefrom, said enclosure having a rectangular opening on the bottom parallel to and slightly above the surface to be swept, said opening being between the wheels and extending transversely to the normal direction of sweeping motion of the frame, partially cylindrical walls extending upwardly from said opening, a cylindrical brush mounted for rotation about an axis above and parallel to the rectangular opening, said brush being of a diameter in respect to the opening so that the tips of the bristles sweep down through said opening and into engagement with the surface being swept, power transmission means connecting the engine and the brush for rotating it in a direction so that the bristles in contact with the surface being swept move in the forward direction of propulsion of the vehicle, a refuse hopper within the enclosure behind the cylindrical brush, a solid-air separator in the enclosure directly above the refuse space and in the path of flow of air withdrawn from the enclosure by the suction blower and flexible skirt means around the periphery of said rectangular opening, the portion of said skirt means which is in the direction of normal forward movement being composed of a plurality of separate skirts spaced slightly from each other in the direction of normal forward movement, the most interior of said flexible skirts in respect to said opening being of a size such that it is normally spaced slightly above a flat surface over which the sweeping machine is propelled.

8. In a power sweeping machine, a frame having thereon propulsion wheels and steering wheel means, an engine and transmission connecting the engine to the propulsion wheels for driving them forwardly and rearwardly and means for steering the steering wheel means, said machine being characterized in that there is provided on said frame an enclosure capable of being partially evacuated, and a vacuum blower on the frame connected to the engine so as to be driven thereby and having its inlet connected to the enclosure for drawing air therefrom, said enclosure having at least one opening on the bottom thereof parallel to and slightly above the surface to be swept, a broom connected to said engine so as to be driven thereby, said broom being mounted for rotation in contact with the area being swept within said opening, a flexible skirt around the periphery of said opening, the portions of this skirt on that side of the opening which is in a direction of normal movement being of a size so as to drag in contact with the surface being swept, those portions of the skirt which are generally parallel to the direction of normal forward movement being spaced at a minimal distance above said surface and those portions of said skirt which are away from the direction of normal forward motion being spaced from said surface a distance which is greater than said minimal spacing, the capacity of said blower being such that it provides for the movement of an average of about 30 to about 70 cubic feet of free air per minute per square inch of clearance opening under said skirt portions which are elevated above the surface being swept.

9. The power sweeping machine of claim 8 further characterized in that the capacity of said blower is from 50 to 60 cubic feet of free air per minute per square inch of clearance opening under said skirt portions which are elevated above the surface being swept.

10. In a power sweeping machine, a frame having thereon propulsion wheels and steering wheel means, an engine and transmission connecting the engine to the wheels for driving them forwardly and rearwardly and means for steering the steering wheel means, said machine being characterized in that there is provided on the machine a generally rectangular enclosure having sidewalls, a bottom, a top and a rectangular sweeping opening transversely across the machine that opens to the interior thereof, a cylindrical brush mounted for rotation about a horizontal axis generally transverse to the normal straight forward movement of the machine and connected to the engine so as to be rotated thereby, the brush being set at an elevation such that its bristles will sweep downwardly through the opening and in contact with a flat surface over which the machine is propelled, said enclosure being formed with a refuse collection space having a dumping opening, a filter superimposed on said enclosure so as to close said enclosure, said filter comprising a plurality of vertically arranged porous membranes mounted in said housing above said enclosure for discharging filtered solid material directly downwardly into said refuse collection space, a vacuum blower connected to the housing at a position above said filter membranes for withdrawing from said housing and hence from the enclosure, air which enters the enclosure through said sweeping opening, said filter membranes being mounted so as to be movable at the bottom.

11. The power sweeping machine specified in claim 10 further characterized in that shaker means is provided in said enclosure connected to said porous membranes, said shaker means being connected to power means so as to be oscillated thereby for shaking the porous membrane to remove solid materials accumulated thereon for discharge downwardly into said refuse collection space.

12. In a power sweeper machine, a frame having thereon propulsion wheels and steering wheel means, an engine and transmission connecting the engine to the wheels for driving them forwardly and rearwardly and means for steering the steering wheel means, said machine being characterized in that there is provided on the frame a main enclosure capable of being partially evacuated and a vacuum blower on the frame and connected to the engine so as to be driven thereby and having its inlet connected to the main enclosure for drawing air therefrom, said main enclosure having a rectangular opening on the bottom thereof parallel to and slightly above the surface to be swept, said opening being between the wheels and extending transversely to the normal direction of sweeping motion of the frame, a cylindrical brush mounted for rotation about an axis above and parallel to said rectangular opening, said brush being of a diameter in respect to the opening so that the tips of the bristles sweep down through said opening and into engagement with the surface being swept, power transmission means connecting the engine and the brush for rotating it in a direction so that the bristles in contact with the surface being swept move in the forward direction of propulsion of the vehicle, a refuse hopper space within the main enclosure behind the cylindrical brush, a solid-air separator in the main enclosure directly above the refuse space and in the path of flow of air withdrawn from the main enclosure by the suction blower, said frame being provided with a subsidiary enclosure at the forward end thereof extending transversely across said forward end, said subsidiary enclosure being open at the bottom, a pair of gathering brushes mounted for sweeping rotation in said subsidiary enclosure, one of said brushes being mounted at each forward corner of the machine and duct means connecting the subsidiary enclosure to the main enclosure for partially evacuating the subsidiary enclosure when the main enclosure is evacuated.

13. In a power sweeper machine, a frame having thereon propulsion wheels and steering wheel means, an engine and transmission connecting the engine to the wheels for driving them forwardly and rearwardly and means for steering the steering wheel means, said machine being characterized in that there is provided on the frame a main enclosure capable of being partially evacuated and a vacuum blower on the frame and connected to the engine so as to be driven thereby and having its inlet connected to the main enclosure for drawing air therefrom, said main enclosure having a rectangular opening on the bottom thereof parallel to and slightly above the surface to be swept, said opening being between the wheels and extending transversely to the normal direction of sweeping motion of the frame, a cylindrical brush mounted for rotation about an axis above and parallel to said rectangular opening, said brush being of a diameter in respect to the opening so that the tips of the bristles sweep down through said opening and into engagement with the surface being swept, power transmission means connecting the engine and the brush for rotating it in a direction so that the bristles in contact with the surface being swept move in the forward direction of propulsion of the vehicle, a refuse hopper space within the main enclosure behind the cylindrical brush, a solid-air separator in the main enclosure directly above the refuse space and in the path of flow of air withdrawn from the main enclosure by the suction blower, said frame being provided with a subsidiary enclosure extending transversely across the front thereof, said subsidiary enclosure being open at the bottom, said steering wheel means being located centrally within said subsidiary enclosure, a pair of gathering brushes mounted for rotation about upright axes in said subsidiary enclosure, said gathering brushes being connected to the engine so as to be driven thereby in a direction of rotation for sweeping material toward the centerline of the machine, baffle means within said subsidiary enclsure at each side of said steering wheel means and in the path of material swept by said gatherting brushes for depositing said material in a position other than in front of said steering wheel means and a connection between said subsidiary enclosure and said main enclosure so that the subsidiary enclosure is partially evacuated when the main enclosure is partially evacuated.

References Cited by the Examiner

UNITED STATES PATENTS

| 417,566 | 12/89 | Knowles et al. | 15—370 X |
| 1,187,209 | 6/16 | Warner | 15—340 X |

(Other references on following page)

UNITED STATES PATENTS

| | | | |
|---|---|---|---|
| 1,507,243 | 9/24 | Meyer | 15—340 X |
| 1,546,441 | 7/25 | Frayer | 15—340 X |
| 1,610,119 | 12/26 | Butler | 15—352 X |
| 1,818,736 | 8/31 | Moore | 183—58 |
| 2,612,236 | 9/52 | Vedder | 183—58 |
| 2,681,155 | 6/54 | Graham | 183—71 X |
| 2,784,440 | 3/57 | Newport | 15—340 |
| 2,859,461 | 11/58 | Machovec | 15—340 X |
| 2,990,019 | 6/61 | Finn | 15—345 X |
| 3,006,021 | 10/61 | Patch | 15—340 |

FOREIGN PATENTS

| | | |
|---|---|---|
| 456,783 | 11/36 | Great Britain. |
| 808,026 | 1/59 | Great Britain. |

WALTER A. SCHEEL, *Primary Examiner.*

CHARLES A. WILLMUTH, *Examiner.*